US011336473B2

(12) United States Patent
Yeh et al.

(10) Patent No.: US 11,336,473 B2
(45) Date of Patent: May 17, 2022

(54) NETWORK AND METHOD FOR DELIVERING CONTENT WHILE MINIMIZING CONGESTION COSTS BY JOINTLY OPTIMIZING FORWARDING AND CACHING STRATEGIES

(71) Applicant: Northeastern University, Boston, MA (US)

(72) Inventors: Edmund Meng Yeh, Newton, MA (US); Milad Mahdian, New York, NY (US)

(73) Assignee: Northeastern University, Boston, MA (US)

( * ) Notice: Subject to any disclaimer, the term of this patent is extended or adjusted under 35 U.S.C. 154(b) by 149 days.

(21) Appl. No.: 16/754,067

(22) PCT Filed: Oct. 12, 2018

(86) PCT No.: PCT/US2018/055664
§ 371 (c)(1),
(2) Date: Apr. 6, 2020

(87) PCT Pub. No.: WO2019/075363
PCT Pub. Date: Apr. 18, 2019

(65) Prior Publication Data
US 2020/0328905 A1    Oct. 15, 2020

Related U.S. Application Data

(60) Provisional application No. 62/572,125, filed on Oct. 13, 2017, provisional application No. 62/669,800, filed on May 10, 2018.

(51) Int. Cl.
*H04L 12/14* (2006.01)
*H04L 67/568* (2022.01)
*H04L 67/60* (2022.01)

(52) U.S. Cl.
CPC ...... *H04L 12/1432* (2013.01); *H04L 67/2842* (2013.01); *H04L 67/32* (2013.01)

(58) Field of Classification Search
CPC . H04L 12/1432; H04L 67/2842; H04L 67/32; H04L 67/1097; H04L 67/28; H04L 45/00; H04L 28/08; H04L 12/701
See application file for complete search history.

(56) References Cited

U.S. PATENT DOCUMENTS

| 9,559,889 B1 * | 1/2017 | Vincent | H04L 67/2842 |
| 2008/0091840 A1 * | 4/2008 | Guo | H04L 67/28 |
| | | | 709/231 |

(Continued)

FOREIGN PATENT DOCUMENTS

WO    2019/075363 A1    4/2019

OTHER PUBLICATIONS

Ran Liu et al., "Forwarding, Caching and Congestion Control in Named Data Networks: Implementation and Experimental Analysis", Oct. 21, 2013, 19 pages.

(Continued)

*Primary Examiner* — Mewale A Ambaye
(74) *Attorney, Agent, or Firm* — Hamilton, Brook, Smith & Reynolds, P.C.

(57) ABSTRACT

Embodiments include a unified framework for minimizing congestion-dependent network cost by jointly optimizing forwarding and caching strategies that account for link congestion between neighboring nodes. As caching variables are integer-constrained, the resulting optimization problem is a non-deterministic polynomial time (NP)-hard problem. Embodiments relax the optimization problem, where caching variables are real-valued. Embodiments include optimality conditions for the relaxed problem. Embodiments include an adaptive and distributed joint forwarding and caching method, based on a conditional gradient method. Embodiments elegantly yield feasible routing variables and integer caching variables at each iteration, and can be implemented in a distributed manner with low complexity and overhead. Over a wide range of network topologies, simulation results show that embodiments have significantly better delay performance in the low to moderate request rate regions. Furthermore, embodiments complement each other in delivering superior delay performance across the range of request arrival rates, compared to existing methods.

22 Claims, 21 Drawing Sheets

(56) References Cited

U.S. PATENT DOCUMENTS

| | | | |
|---|---|---|---|
| 2010/0095012 A1* | 4/2010 | Zuckerman | H04L 67/1097 709/231 |
| 2013/0179490 A1* | 7/2013 | Naga | G06F 16/172 709/203 |
| 2013/0268733 A1* | 10/2013 | Narayanan | H04L 67/2842 711/119 |
| 2016/0065689 A1 | 3/2016 | Imai | |
| 2016/0149810 A1* | 5/2016 | Liu | H04L 45/124 370/392 |
| 2016/0255169 A1* | 9/2016 | Kovvuri | G06F 12/126 709/219 |
| 2019/0339688 A1* | 11/2019 | Cella | G05B 23/0229 |

OTHER PUBLICATIONS

International Search Report and Written Opinion for International Application No. PCT/US2018/055664, entitled "Network and Method for Delivering Content", dated Jan. 22, 2019.

\* cited by examiner

NETWORK AND METHOD FOR DELIVERING CONTENT WHILE MINIMIZING CONGESTION COSTS BY JOINTLY OPTIMIZING FORWARDING AND CACHING STRATEGIES

RELATED APPLICATIONS

This application is the U.S. National Stage of International Application No. PCT/US2018/055664, filed Oct. 12, 2018, which designates the U.S., published in English, and claims the benefit of U.S. Provisional Application No. 62/669,800, filed on May 10, 2018 and U.S. Provisional Application No. 62/572,125, filed on Oct. 13, 2017. The entire teachings of the above applications are incorporated herein by reference.

GOVERNMENT SUPPORT

This invention was made with government support under Grant No.: CNS1423250 from the National Science Foundation. The government has certain rights in the invention.

BACKGROUND

Modern computer networks take advantage of routing, caching, and forwarding decisions in order to improve efficiency and packet throughput and latency. Improvements in these areas are needed.

SUMMARY

Embodiments of the present disclosure are directed to networks (including but not limited to content delivery networks), network nodes, computer methods, systems, and computer program products that operate in networks that route requests in a network and replicate and store content. According to some embodiments, routing decisions, i.e., determining where requests for content should be forwarded, and caching and storage decisions, i.e., determining where content should be stored, are jointly determined and done so in a manner that considers link congestion between neighboring nodes in the network. Through this method, embodiments of the present disclosure deliver content in a more efficient manner than existing methods that do not jointly consider forwarding and caching parameters.

In some embodiments, a network (or content delivery network) includes nodes communicatively coupled to neighboring nodes via respective links in the network. Each node may be configured to cache a unit of content and send a content request to an upstream neighboring node to request the unit of content if not cached. The network node may comprise a network interface and a processor. The processor (or a given node among the nodes) may be configured to calculate (i) marginal cost of caching the unit of content and (ii) marginal cost of forwarding the content request to at least one neighboring node. At least one of the (1) the marginal cost of the forwarding the content request, and (2) the marginal cost of the caching the unit of content, may be dependent on both link congestion between the given node and the at least one neighboring node and link congestion on links of an upstream path of nodes toward and including a source node. The source node may be guaranteed to have the unit of content available. Each node along the upstream path may be configured to perform a respective calculation of the cost and to report same to its downstream neighboring node making the content request. The processor (or the given node) may be configured to direct content of the unit of content for delivery to a destination node via the network interface.

The following example embodiments are described in reference to a network embodiment, but pertain similarly to the computer methods, network nodes, systems, and computer program products.

In some embodiments, the marginal cost of the forwarding of the content request to update variables of the caching and the forwarding is performed by solving a linear program with a gradient. Each iteration of the linear program may result in an integer value.

In some embodiments, the unit of content comprises data units or chunks thereof of equal size.

In some embodiments, the total arrival rate of requests at the given node for the unit of content includes content requests from outside of the network and content requests from within the network.

Some embodiments further comprise calculating cache scores from a product of a total arrival rate of requests at the given node for the unit of content and corresponding marginal costs of forwarding the requests. The embodiments may further comprise determining whether to cache a unit of content at the given node based on its corresponding cache score.

Some embodiments determine whether to cache the unit of content based upon a ranking of highest values of the cache scores associated with respective units of content and cache the unit of content based on the ranking.

In some embodiments, a rate of arrival of requests for the unit of content changes over time. Each node may adapt to the changes (or the processor may adapt the network to the changes) by (i) making a decision to cache the unit of content based upon the cache scores, and (ii) making a decision to forward the requests for the unit of content based upon the marginal forwarding cost.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
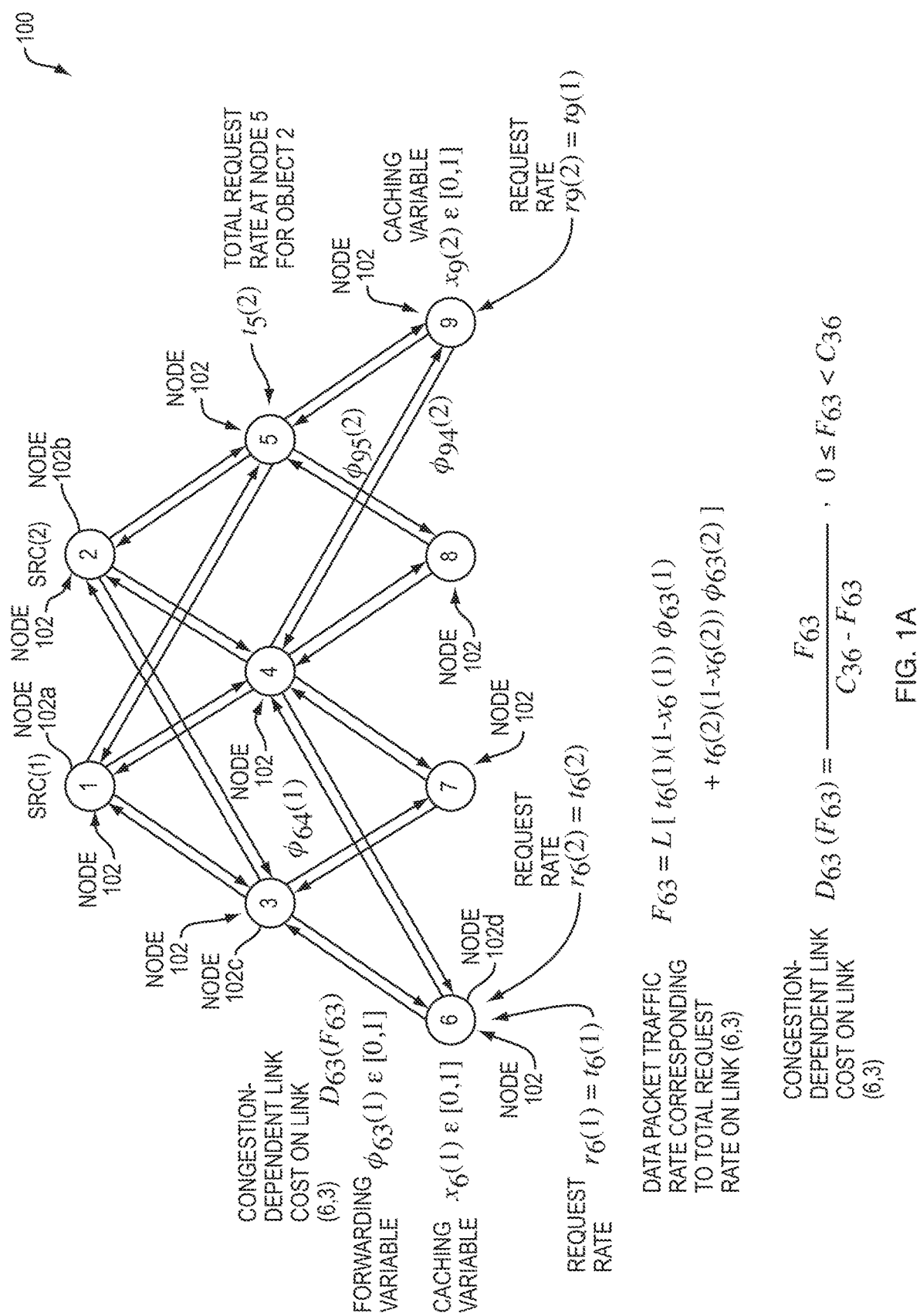
FIG. 1A is a high-level block diagram of forwarding and caching at nodes of a network, according to some embodiments.

A description of example embodiments follows.

The teachings of all patents, published applications and references cited herein are incorporated by reference in their entirety.

Existing approaches to forwarding requests for content in a computer network have multiple problems. For example, existing approaches are not capable of jointly handling both forwarding and caching content effectively. In existing approaches, the problem of jointly handling forwarding and caching together is a non-deterministic polynomial time (NP)-hard problem, and therefore challenging to implement with efficient computational complexity.

Embodiments of the present disclosure solve the problems associated with existing approaches. Embodiments provide computer methods, systems, and computer program products for jointly handling forwarding and caching to deliver content. In stark contrast to existing approaches, embodiments reduce computational complexity and overcome the problem of NP-hard optimization, by relaxing optimization to include real-valued caching variables.

Embodiments of the present disclosure have multiple advantages compared with existing approaches. As such, according to some embodiments, the networks, computer methods, systems, and computer program products make joint caching and forwarding decisions. These embodiments are distributed, in that a storage device in the network may make decisions based on packets passing through the storage device. In other words, an embodiment of a method may operate based on packets passing through given nodes and on communications with immediate neighboring nodes. These embodiments are adaptive, in that storage contents may automatically adapt to changes in content demand.

It should be understood that descriptions with respect to one embodiment, e.g., a method, may equally apply to alternative embodiments, e.g., a network or system.

According to some embodiments, additional advantages include but are not limited to the following. In contrast to existing techniques, an embodiment of the method may be explicitly designed to minimize congestion-dependent network costs through jointly optimal request forwarding and caching. At low-to-intermediate request arrival rates, the method may be configured to provide latency performance significantly lower than any other known method, in evaluations over a broad array of network topologies. In addition, embodiments complement each other in delivering superior delay performance across the entire range of request arrival rates, when compared to existing routing and caching methods.

Relative to a Virtual Interest Packet (VIP) method, embodiments using MinDelay provide improved delay performance in the low to moderate request rate regions, whereas the VIP method (when not used in conjunction with Applicant's embodiments) has lower delay for high request rate regions. However, according to some embodiments, MinDelay and VIP complement each other (and be used in conjunction with each other), thereby providing further improved delay performance compared with existing approaches.

In addition, embodiments include a unified framework for minimizing congestion-dependent network cost in caching networks (including but not limited to content delivery networks, peer to peer networks, wireless edge networks, edge computing networks, cloud computing networks, information-centric networks, or any other networks known to one skilled in the art) by jointly optimizing forwarding and caching strategies. As caching variables are integer-constrained, the resulting optimization problem is NP-hard. Embodiments include a relaxed version of the optimization problem, where caching variables are real-valued. Embodiments include optimality conditions for the relaxed problem. Embodiments include an adaptive and distributed joint forwarding and caching method, based on a conditional gradient method. Embodiments elegantly yield feasible routing variables and integer caching variables at each iteration, and can be implemented in a distributed manner with low complexity and overhead. Over a wide range of network topologies, simulation results show that embodiments have significantly better delay performance in the low to moderate request rate regions. Furthermore, embodiments complement each other in delivering superior delay performance across the entire range of request arrival rates.

An example embodiment of a method includes specifying how to forward requests (at routers) for content and place contents in storage devices (caches) in a network to minimize congestion-dependent network cost, such as latency. The method simultaneously determines dynamic request forwarding and caching, adaptive to request demand in the network. The method works for general multi-hop network topologies given any loop-free request routing method. The method can be implemented in a distributed manner.

Example features include but are not limited to the following. The method may minimize congestion-dependent network cost (such as latency) by jointly optimizing dynamic request forwarding and caching. For forwarding, the method may prioritize interfaces that have the lowest "upstream" marginal congestion costs; for caching, the method may prioritize contents that have the highest product of total average incoming request rate and (lowest) marginal congestion cost. In one embodiment, the method is distributed, in that routers and storage devices make decisions on forwarding and caching based on packets passing through them and on communications with immediate neighboring nodes. The method may be adaptive, in that forwarding and caching automatically adapt to changes in content demand.

According to some embodiments, the method may apply to one or more commercial applications known to one skilled in the art. The method can directly find application in any system in which content is retrieved and placed in a network with varying demand. This includes but is not limited to: Content delivery networks, Information centric networks, Wireless edge networks, Peer-to-peer networks, and Cloud computing.

As illustrated in FIG. 1A, some embodiments may include two data objects and various nodes 102 in the network 100. According to some embodiments, the server for object 1 is at node 1 (element 102a), and the server for object 2 is at node 2 (element 102b). Links are directed, with link capacity $C_{ij}$ (bits/sec) on link (i,j). At node 6 (element 102d), the exogenous request rate for object i is $r_6(i)$, i=1, 2, which is the same as the total request rate $t_6(i)$ for object i. The caching variables at node 6 (element 102d) are $x_6(i)$, i=1, 2, taking values in $\{0, 1\}$. The forwarding variables on link (6, 3) (from node 102d to node 102c) are $\phi_{63}(i)$, i=1, 2, taking values in the interval $[0, 1]$. The data packet traffic rate (bits/sec) corresponding to the total request rate (summed over all data objects) on link (6, 3) is $F_{63}$, and the congestion-dependent link cost on (6, 3) is $D_{63}(F_{63})$. L is the size of the data packets in bits.

Some embodiments include a new unified framework for minimizing congestion-dependent network cost by jointly optimizing forwarding and caching strategies. As caching variables are integer-constrained, the resulting optimization problem is NP-hard. To make progress, some embodiments include a relaxed version of the optimization problem, where caching variables are allowed to be real-valued. Some embodiments include necessary optimality conditions for the relaxed problem, and leverage this result to design MinDelay, an adaptive and distributed joint forwarding and caching method, based on the conditional gradient method. The MinDelay method elegantly yields feasible routing variables and integer caching variables at each iteration, and can be implemented in a distributed manner with low complexity and overhead. Over a wide range of network topologies, simulation results show that MinDelay typically has significantly better delay performance in the low to moderate request rate regions. Furthermore, the MinDelay and VIP methods complement each other in delivering superior delay performance across the entire range of request arrival rates.

1 Introduction

Research on information-centric networking (ICN) architectures over the past few years has brought focus on a number of central network design issues. One prominent issue is how to jointly design traffic engineering and caching strategies to maximally exploit the bandwidth and storage resources of the network for optimal performance. While traffic engineering and caching have been investigated separately for many years, their joint optimization within an ICN setting is still an under-explored area.

There have been many interesting papers on caching strategies within ICN architectures [8], [7], [1], [21], [18], [5], [9], [10], [17], [2], [13]. When designing and evaluating the effectiveness of a cache management method for such networks, the primary performance metrics have been cache hit probability [5], the reduction of the number of hops to retrieve the requested content [9], age-based caching [10], [17] or content download delay [2].

Recently, in [13], Ioannidis and Yeh formulate the problem of cost minimization for caching networks with fixed routing and linear link cost functions, and propose an adaptive, distributed caching method which converges to a solution within a (1-1/e) approximation from the optimal.

Similarly, there have been a number of attempts to enhance the traffic engineering in ICN [6], [19], [11], [16], [24]. In [6], Carofiglio et al., formulate the problem of joint multipath congestion control and request forwarding in ICN as an optimization problem. By decomposing the problem into two subproblems of maximizing user throughput and minimizing overall network cost, they develop a receiver-driven window-based Additive-Increase Multiplicative-Decrease (AIMD) congestion control method and a hop-by-hop dynamic request forwarding method which aim to balance the number of pending Interest Packets of each content object (flow) across the outgoing interfaces at each node. Unfortunately, the work in [6] does not consider caching policies.

Posch et al. [19] propose a stochastic adaptive forwarding strategy which maximizes the Interest Packet satisfaction ratio in the network. The strategy imitates a self-adjusting water pipe system, where network nodes act as crossings for an incoming flow of water. Each node then intelligently guides Interest Packets along their available paths while circumventing congestion in the system.

In [23], Yeh et al., present one of the first unified frameworks for joint forwarding and caching for ICN networks with general topology, in which a virtual control plane operates on the user demand rate for data objects in the network, and an actual plane handles Interest Packets and Data Packets. They develop VIP, a set of distributed and dynamic forwarding and caching methods which adaptively maximizes the user demand rate the ICN can satisfy.

In this work, some embodiments include a new unified framework for minimizing congestion-dependent network cost by jointly choosing node-based forwarding and caching variables, within a quasi-static network scenarios where user request statistics vary slowly. Some embodiments include the network cost to be the sum of link costs, expressed as increasing and convex functions of the traffic rate over the links. When link cost functions are chosen according to an M/M/1 approximation, minimizing the network cost corresponds to minimizing the average request fulfillment delay in the network. As caching variables are integer-constrained, the resulting joint forwarding and caching (JFC) optimization problem is NP-hard. To make progress toward an approximate solution, some embodiments include a relaxed version of the JFC problem (RJFC), where caching variables are allowed to be real-valued. Using techniques first introduced in [12], some embodiments include necessary optimality conditions for the RJFC problem. Some embodiments leverage this result to design MinDelay, an adaptive and distributed joint forwarding and caching method for the original JFC problem, based on a version of the conditional gradient, or Frank-Wolfe method. The MinDelay method elegantly yields feasible routing variables and integer caching variables at each iteration, and can be implemented in a distributed manner with low complexity and overhead.

Finally, some embodiments include the MinDelay method using some embodiments' Java-based network simulator, and present extensive experimental results. Some embodiments include three competing methods, including the VIP method [23], which directly competes against MinDelay as a jointly optimized distributed and adaptive forwarding and caching method. Over a wide range of network topologies, simulation results show that while the VIP method performs well in high request arrival rate regions, MinDelay typically has significantly better delay performance in the low to moderate request rate regions. Thus, the MinDelay and VIP methods complement each other in delivering superior delay performance across the entire range of request arrival rates.

2 Network Model

Consider a general multi-hop network modeled by a directed and (strongly) connected graph $\mathcal{G} = (\mathcal{N}, \varepsilon)$, where $\mathcal{N}$ and $\varepsilon$ are the node and link sets, respectively. A link (i, j)$\in\varepsilon$ corresponds to a unidirectional link, with capacity $C_{ij} > 0$ (bits/sec). Some embodiments assume a content-centric setting, e.g. [14], where each node can request any data object from a set of objects $\mathcal{K}$. A request for a data object consists of a sequence of Interest Packets which request all the data chunks of the object, where the sequence starts with the Interest Packet requesting the starting chunk, and ends with the Interest Packet requesting the ending chunk. Some embodiments include methods where the sequence of Interest Packets corresponds to a given object request are forwarded along the same path.

Assume that loop-free routing (topology discovery and data reachability) has already been accomplished in the network, so that the Forwarding Interest Base (FIB) tables have been populated for the various data objects. Further, some embodiments include symmetric routing, where Data Packets containing the requested data chunks take the same path as their corresponding Interest Packets, in the reverse direction. Thus, the sequence of Data Packets for a given object request also follow the same path (in reverse). For simplicity, some embodiments do not consider interest suppression, whereby multiple Interest Packets requesting the same named data chunk are collapsed into one forwarded Interest Packet. Some embodiments can be extended to include Interest suppression, by introducing a virtual plane in the manner of [23].

For $k \in \mathcal{K}$, let src(k) be the source node of content object k. We assume there is one source for each content object for simplicity. The results generalize easily to the case of multiple source nodes per content object. Each node in the network has a local cache of capacity $c_i$ (object units), and can optionally cache Data Packets passing through on the reverse path. Note that since Data Packets for a given object request follow the same path, all chunks of a data object can be stored together at a caching location. Interest Packets requesting chunks of a given data object can enter the network at any node, and exit the network upon being satisfied by a matching Data Packet at the content source for the object, or at the nodes which decide to cache the object. For simplicity, some embodiments include all data objects have the same size L (bits). The results of the paper can be extended to the more general case where object sizes differ.

Some embodiments include quasi-static network scenarios where user request statistics vary slowly. Let $r_i(k) \geq 0$ be the average exogenous rate (in requests/sec) at which requests for data object k arrive (from outside the network) to node i. Let $t_i(k)$ be the total average arrival rate of object k requests to node i. Thus, $t_i(k)$ includes both the exogenous arrival rate $r_i(k)$ and the endogenous arrival traffic which is forwarded from other nodes to node i.

Let $x_i(k) \in \{0, 1\}$ be the (integer) caching decision variable for object k at node i, where $x_i(k)=1$ if object k is cached at node i and $x_i(k)=0$ otherwise. Thus, $t_i(k)x_i(k)$ is the portion of the total incoming request rate for object k which is satisfied from the local cache at node i and $t_i(k)(1-x_i(k))$ is the portion forwarded to neighboring nodes based on the forwarding strategy. Furthermore, let $\phi_{ij}(k) \in [0, 1]$ be the (real-valued) fraction of the traffic $t_i(k)(1-x_i(k))$ forwarded over link (i,j) by node i≠src(k). Thus, $\Sigma_{j \in O(i,k)} \phi_{ij}(k)=1$, where O(i, k) is the set of neighboring nodes for which node i has a FIB entry for object k. Therefore, total average incoming request rate for object k to node i is $$t_i(k) = r_i(k) + \Sigma_{l \in \mathcal{J}(i,k)} t_l(k)(1-x_l(k))\phi_{li}(k), \quad (1)$$

where $\mathcal{J}(i, k)$ is the set of neighboring nodes of i which have FIB entries for node i for object k.

Next, let $F_{ij}$ be the Data Packet traffic rate (in bits/sec) corresponding to the total request rate (summed over all data objects) forwarded on link $(i,j) \in \varepsilon$:

$$F_{ij} = \Sigma_{k \in \mathcal{K}} L \cdot t_i(k)(1-x_i(k))\phi_{ij}(k). \quad (2)$$

Note that by routing symmetry and per-hop flow balance, the Data Packet traffic of rate $F_{ij}$ actually travels on the reverse link (j, i).

As in [12] and [22], some embodiments include the total network cost is the sum of traffic-dependent link costs. The cost on link $(j, i) \in \varepsilon$ is due to the Data Packet traffic of rate $F_{ij}$ generated by the total request rate forwarded on link (i, j), as in (2). Some embodiments therefore denote the cost on link (j, i) as $D_{ij}(F_{ij})$ to reflect this relationship. Since Interest Packets are small compared to Data Packets, we do not account for costs associated with the Interest Packet traffic on link (j,i). Some embodiments assume $D_{ij}(F_{ij})$ is increasing and convex in $F_{ij}$. To implicitly impose the link capacity constraint, some embodiments include $D_{ij}(F_{ij}) \to \infty$ as $F_{ij} \to C_{ji}$ and $D_{ij}(F_{ij})=\infty$ for $F_{ij} \geq C_{ji}$. As an example, $$D_{ij}(F_{ij}) = \frac{F_{ij}}{C_{ji} - F_{ij}}, \text{ for } 0 \leq F_{ij} < C_{ji}. \quad (3)$$

gives the average number of packets waiting for or under transmission at link (j, i) under an M/M/1 queuing model [4], [15]. Summing over all links, the network cost $\Sigma_{(i,j)} D_{ij}(F_{ij})$ gives the average total number of packets in the network, which, by Little's Law, is proportional to the average system delay of packets in the network.

a) 3 Optimization Problem

Some embodiments now pose the Joint Forwarding and Caching (JFC) optimization problem in terms of the forwarding variables $(\phi_{ij}(k))_{(i,j) \in \varepsilon, k \in \mathcal{K}}$ and the caching variables $(x_i(k))_{i \in \mathcal{N}, k \in \mathcal{K}}$ as follows:

$$\begin{cases} \min \sum_{(i,j) \in \varepsilon} D_{ij}(F_{ij}) & (4) \\ \text{subject to:} \\ \sum_{j \in O(i,k)} \phi_{ij}(k) = 1, & \text{for all } i \in \mathcal{N}, k \in \mathcal{K} \\ \phi_{ij}(k) \geq 0, & \text{for all } (i, j) \in \varepsilon, k \in \mathcal{K} \\ \sum_{k \in \mathcal{K}} x_i(k) \leq c_i, & \text{for all } i \in \mathcal{N} \\ x_i(k) \in \{0, 1\} & \text{for all } i \in \mathcal{N}, k \in \mathcal{K} \end{cases}$$

The above mixed-integer optimization problem can be shown to be NP-hard [20]. To make progress toward an approximate solution, we relax the problem by removing the integrality constraint in (4). Some embodiments formulate the Relaxed JFC (RJFC) problem by replacing the integer caching decision variables $x_i(k) \in \{0,1\}$ by the real-valued variables $\rho_i(k) \in [0,1]$:

$$\begin{cases} \min D \triangleq \sum_{(i,j) \in \varepsilon} D_{ij}(F_{ij}) & (5) \\ \text{subject to:} \\ \sum_{j \in O(i,k)} \phi_{ij}(k) = 1, & \text{for all } i \in \mathcal{N}, k \in \mathcal{K} \\ \phi_{ij}(k) \geq 0, & \text{for all } (i, j) \in \varepsilon, k \in \mathcal{K} \\ \sum_{k \in \mathcal{K}} \rho_i(k) \leq c_i, & \text{for all } i \in \mathcal{N} \\ 0 \leq \rho_i(k) \leq 1, & \text{for all } i \in \mathcal{N}, k \in \mathcal{K} \end{cases}$$

It can be shown that D in (5) is non-convex with respect to (w.r.t.) ($\phi$, $\rho$), where $\phi \equiv (\phi_{ij}(k))_{(i,j) \in \varepsilon, k \in \mathcal{K}}$ and the caching variables $\rho \equiv (x_i(k))_{i \in \mathcal{N}, k \in \mathcal{K}}$. In this work, some embodiments use the RJFC formulation to develop an adaptive and distributed forwarding and caching method for the JFC problem.

Some embodiments proceed by computing the derivatives of D with respect to the forwarding and caching variables, using the technique of [12]. For the forwarding variables, the partial derivatives can be computed as $$\frac{\partial D}{\partial \phi_{ij}(k)} = (1 - \rho_i(k))Lt_i(k)\delta_{ij}(k), \quad (6)$$

where the marginal forwarding cost is $$\delta_{ij}(k) = D'_{ij}(F_{ij}) + \frac{\partial D}{\partial r_j(k)}. \quad (7)$$

Note that $$\frac{\partial D}{\partial r_j(k)}$$

in (7) stands for me marginal cost due to a unit increment of object k request traffic at node j. This can be computed recursively by $$\frac{\partial D}{\partial r_j(k)} = 0, \text{ if } j = src(k), \quad (8)$$

$$\frac{\partial D}{\partial r_i(k)} = (1 - \rho_i(k))L \sum_{j \in O(i,k)} \phi_{ij}(k)\delta_{ij}(k), \text{ if } i \neq src(k).$$

Finally, according to some embodiments, the method computes the partial derivatives w.r.t. (with respect to) the (relaxed) caching variables as follows:

$$\frac{\partial D}{\partial \rho_i(k)} = -Lt_i(k) \sum_{j \in O(i,k)} \phi_{ij}(k)\delta_{ij}(k). \quad (9)$$

The minimization in (5) is equivalent to minimizing the Lagrangian function $$L(F,\lambda,\mu) = \Sigma_{(i,j) \in \varepsilon} D_{ij}(F_{ij}) - \Sigma_{i,k}\lambda_{ik}(\Sigma_j \phi_{ij}(k)-1) + \Sigma_i \mu_i(\Sigma_{k \in \mathcal{K}} \rho_i(k) - c_i). \quad (10)$$

subject to the following constraints:

$0 \leq \rho_i(k) \leq 1$, for all $i \in \mathcal{N}, k \in \mathcal{K}$, $\phi_{ij}(k) \geq 0$, for all $(i,j) \in \varepsilon, k \in \mathcal{K}$, $\mu_i \geq 0$, for all $i \in \mathcal{N}$.

A set of necessary conditions for a local minimum to the RJFC problem can now be derived as $$\frac{\partial D}{\partial \phi_{ij}(k)} \begin{cases} = \lambda_{ik}, & \text{if } \phi_{ij}(k) > 0 \\ \geq \lambda_{ik}, & \text{if } \phi_{ij}(k) = 0 \end{cases} \quad (11)$$

$$\frac{\partial D}{\partial \rho_i(k)} \begin{cases} = -\mu_i, & \text{if } 0 < \rho_i(k) < 1 \\ \geq -\mu_i, & \text{if } \rho_i(k) = 0 \\ \leq -\mu_i, & \text{if } \rho_i(k) = 1 \end{cases} \quad (12)$$

with the complementary slackness condition $\mu_i(\Sigma_{k \in \mathcal{K}} \rho_i(k) - c_i) = 0$, for all $i \in \mathcal{N}$. (13)

The conditions (11)-(13) are necessary for a local minimum to the RJFC problem, but upon closer examination, it can be seen that they are not sufficient for optimality. An example from [12] shows a forwarding configuration (without caching) where (11) is satisfied at every node, and yet the operating point is not optimal. In that example, $t_i(k)=0$ at some node i, which leads to (11) being automatically satisfied for node i. This degenerate example applies as well to the joint forwarding and caching setting considered here.

Figure 1B:
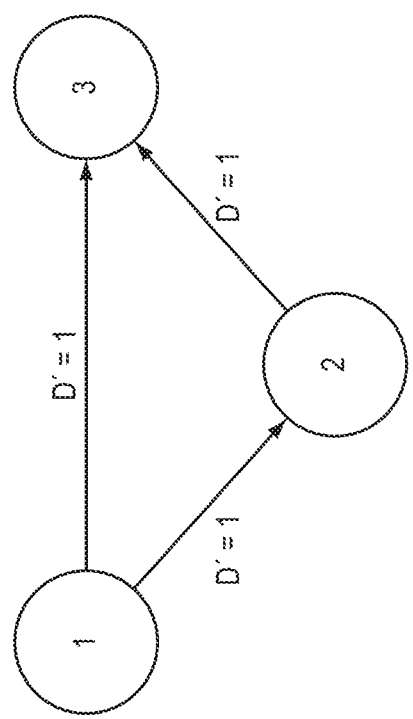
FIG. 1B is a simple topology of a network in which some embodiments may be configured to operate.

A further issue arises for the joint forwarding and caching setting where $\rho_i(k)=1$ for some i and k. In this case, the condition in (11) at node i is automatically satisfied for every $j \in O(i, k)$, and yet the operating point need not be optimal. To illustrate this, consider the simple network shown in FIG. 1B with two objects 1 and 2, where $r_1(1)=1$, $r_1(2)=1.5$, $c_1=1$, $c_2=0$ and $src(1)=src(2)=3$. At a given operating point, assume $\rho_1(1)=1$, $\phi_{12}(1)=1$ and $\phi_{13}(2)=1$. Thus, $\rho_1(2)=0$, $\phi_{13}(1)=0$ and $\phi_{12}(2)=0$. It is easy to see that all the conditions in (11) and (12) are satisfied. However, the current operating point is not optimal. An optimal point is in fact reached when object 2 is cached at node 1, instead. That is, $\rho_1(2)=1$, $\phi_{13}(1)=\phi_{13}(2)=1$.

This example, along with the example in [12], show that when $\rho_i(k)=1$ or $t_i(k)=0$, node i still needs to assign forwarding variables for object k in the optimal way. In the degenerate cases where $\rho_i(k)=1$ or $t_i(k)=0$, removing the term $t_i(k)(1-\rho_i(k))$ from (11) prevents non-optimal forwarding choices. Furthermore, since the term $t_i(k)(1-\rho_i(k))$ is not a function of $j \in O(i, k)$, it can also be removed from condition (11) when $t_i(k)(1-\rho_i(k))>0$. Some embodiments therefore focus on the following modified conditions $$\delta_{ij}(k) \begin{cases} = \delta_i(k), & \text{if } \phi_{ij}(k) > 0 \\ \geq \delta_i(k) & \text{if } \phi_{ij}(k) = 0 \end{cases} \quad (14)$$

$$t_i(k)\delta_i(k) \begin{cases} = \mu_i, & \text{if } 0 < \rho_i(k) < 1 \\ \geq \mu_i, & \text{if } \rho_i(k) = 0 \\ \leq \mu_i, & \text{if } \rho_i(k) = 1 \end{cases} \quad (15)$$

where $$\delta_i(k) = \min_{m \in O(i,k)} \delta_{im}(k). \quad (16)$$

In (15), some embodiments used the fact that $\Sigma_{j=O(i,k)}\phi_{ij}(k)\delta_{ij}(k)=\delta_i(k)$ if condition (14) is satisfied. Condition (15) suggests a structured caching policy. In some embodiments, the method sorts the data objects in decreasing order with respect to the "cache scores" $\{t_i(k)\delta_i(k)\}$, and cache the top $c_i$ objects, i.e. set $\rho_i(k)=1$ for the top $c_i$ objects, and then condition (15) is satisfied. This is indeed the main idea underlying the caching method according to some embodiments, described herein.

a) 4 Distributed Method: MinDelay

The conditions in (14)-(15) give the general structure for a joint forwarding and caching method for solving the RJFC problem. For forwarding, each node i must decrease those forwarding variables $\phi_{ij}(k)$ for which the marginal forwarding cost $\delta_{ij}(k)$ is large, and increase those for which it is small. For caching, node i must increase the caching variables $\rho_i(k)$ for which the cache score $t_i(k)\delta_i(k)$ is large and decrease those for which it is small. To describe the joint forwarding and caching method, some embodiments include a protocol for calculating the marginal costs, and then describe an method for updating the forwarding and caching variables.

Note that each node i can estimate, as a time average, the link traffic rate $F_{ij}$ for each outgoing link (i,j). This can be done by either measuring the rate of received Data Packets on each of the corresponding incoming links (j, i), or by measuring the request rate of Interest Packets forwarded on the outgoing links (i, j). Thus, given a functional form for $D_{ij}(.)$, node i can compute $D'_{ij}(F_{ij})$.

Assuming a loop-free routing graph on the network, one has a well-defined partial ordering where a node m is downstream from node i with respect to object k if there exists a routing path from m to src(k) through i. A node i is upstream from node m with respect to k if m is downstream from i with respect to k.

To update the marginal forwarding costs, the nodes use the following protocol. Each node i waits until it has received the value $\partial D/\partial r_j(k)$ from each of its upstream neighbors with respect to object k (with the convention $\partial D/\partial r_{src(k)}(k)=0$). Node i then calculates $\partial D/\partial r_i(k)$ according to (8) and broadcasts this to all of its downstream neighbors with respect to k. The information propagation can be done by either piggybacking on the Data Packets of the corresponding object, or by broadcasting a single message regularly to update the marginal forwarding costs of all the content objects at once.

Having described the protocol for calculating marginal costs, some embodiments include the method for updating the forwarding and caching variables. According to some embodiments, the method is based on the conditional gradient or Frank-Wolfe method [3]. Let $$\Phi^n = \begin{bmatrix} (\phi_{ij}^n(k))_{i \in \mathcal{N}, k \in \mathcal{K}, j \in O(i,k)} \\ (\rho_i^n(k))_{i \in \mathcal{N}, k \in \mathcal{K}} \end{bmatrix}$$

be the vector of forwarding and caching variables at iteration n. Then, the conditional gradient method is given by $$\Phi^{n+1} = \Phi^n + \alpha^n(\overline{\Phi}^n - \Phi^n), \quad (17)$$

where $a^n \in (0,1]$ is a positive stepsize, and $\overline{\Phi}^n$ is the solution of the direction finding subproblem $$\overline{\Phi}^n \in \arg\min_{\Phi \in F} \nabla D(\Phi^n)'(\Phi - \Phi^n). \quad (18)$$

Here, $\nabla D(\Phi^n)$ is the gradient of the objective function with respect to the forwarding and caching variables, evaluated at $\Phi^n$. The set F is the set of forwarding and caching variables $\Phi$ satisfying the constraints in (5), seen to be a bounded polyhedron.

The idea behind the conditional gradient method is to iteratively find a descent direction by finding the feasible direction $\overline{\Phi}^n - \Phi^n$ at a point $\Phi^n$, where $\overline{\Phi}^n$ is a point of F that lies furthest along the negative gradient direction $-\nabla D(\Phi^n)$ [3].

In applying the conditional gradient method, some embodiments include encounter the same problem regarding degenerate cases as seen in Section 3 with respect to optimality conditions. Note that when $t_i(k)(1-\rho_i(k))=0$, the $$\frac{\partial D}{\partial \phi_{ij}(k)}$$

component of $\nabla D(\Phi^n)$ is zero, and thus provides no useful information for the optimization in (18) regarding the choice of $\overline{\Phi}^n$. On the other hand, when $t_i(k)(1-\rho_i(k))>0$, eliminating this term from $$\frac{\partial D}{\partial \phi_{ij}(k)}$$

in (18) noes not change the choice of $\overline{\Phi}^n$, since $t_i(k)(1-\rho_i(k))>0$ is not a function of $j \in O(i,k)$. Motivated by this observation, some embodiments define some embodiments define $$G(\Phi^n) \triangleq \begin{bmatrix} (\delta_{ij}^n(k))_{i \in \mathcal{N}, k \in \mathcal{K}, j \in O(i,k)} \\ \left(-t_i^n(k)\sum_{j=O(i,k)} \phi_{ij}^n(k)\delta_{ij}^n(k)\right)_{i \in \mathcal{N}, k \in \mathcal{K}} \end{bmatrix}, \quad (19)$$

where $\delta_{ij}^n(k)$ and $t_i^n(k)$ are the marginal forwarding costs and total request arrival rates, respectively, evaluated at $\Phi^n$.

Some embodiments include a modified conditional gradient method where the direction finding subproblem is given by $$\overline{\Phi}^n \in \arg\min_{\Phi \in F} G(\Phi^n)'(\Phi - \Phi^n). \quad (20)$$

It can easily be seen that (20) is separable into two subproblems.

The subproblem for $(\phi_{ij}(k))$ is given by $$\begin{cases} \min \sum_{(i,k)} \sum_{j \in O(i,k)} \delta_{ij}^n(k)(\phi_{ij}(k) - \phi_{ij}^n(k)) & (21) \\ \text{subject to:} \\ \sum_{j \in O} \phi_{ij}(k) = 1, \text{ for all } i \in \mathcal{N}, k \in \mathcal{K} \\ \phi_{ij}(k) \geq 0, \text{ for all } i \in \mathcal{N}, k \in \mathcal{K}, j \in O(i,k) \end{cases}$$

where $$\delta_{ij}^n(k) = D_{ij}'(F_{ij}^n) + \frac{\partial D}{\partial r_j^n(k)}. \quad (22)$$

It is straightforward to verify that a solution $\overline{\phi}_i^n(k) = (\overline{\phi}_{ij}^n(k))_{j \in O(i,k)}$ to (21) has all coordinates equal to zero except for one coordinate, say $\overline{\phi}_{im}^n(k)$, which is equal to 1, where $$m \in \arg\min_{j \in O(i,k)} \delta_{ij}^n(k). \quad (23)$$

corresponds to an outgoing interface with the minimal marginal forwarding cost. Thus, the update equation for the forwarding variables is: for all $i \in \mathcal{N}$, $$\phi_{ij}^{n+1}(k) = (1-a^n)\phi_{ij}^n(k) + a^n \overline{\phi}_{ij}^n(k), \forall k \in \mathcal{K}, j \in O(i,k). \quad (24)$$

The subproblem for $(\rho_i(k))$ is equivalent to $$\begin{cases} \min \sum_{(i,k)} \omega_i^n(k)(\rho_i(k) - \rho_i^n(k)) & (25) \\ \text{subject to:} \\ \sum_{k \in \mathcal{K}} \rho_i(k) \leq c_i, \text{ for all } i \in \mathcal{N} \\ 0 \leq \rho_i(k) \leq 1, \text{ for all } i \in \mathcal{N}, k \in \mathcal{K} \end{cases}$$

where $\omega_i^n(k) = t_i^n(k)(\Sigma_{j \in O(ik)} \phi_{ij}^n(k)\delta_{ij}^n(k))$. The subproblem (25) is a max-weighted matching problem which has an integer solution. For node i, let $\omega_i^n(k_1) \geq \omega_i^n(k_2) \geq \ldots \geq \omega_i^n(k_{|\mathcal{K}|})$ be a re-ordering of the $\omega_i^n(k)$'s in decreasing order. A solution $\overline{\rho}_i^n$ to (25) has $\overline{\rho}_i^n(k)=1$ for $k \in \{k_1, k_2, \ldots, k_{c_i}\}$, and $\overline{\rho}_i^n(k)=0$ otherwise. That is, $\overline{\rho}_i^n(k)=1$ for the $c_i$ objects with the largest $\omega_i^n(k)$ values, and $\bar{\rho}_i^n(k)=0$ otherwise. The update equation for the caching variables is: for all $i \in N$, $$\rho_i^{n+1}(k)=(1-a^n)\rho_i^n(k)+a^n\bar{\rho}_i^n(k), \text{ for all } k \in K. \quad (26)$$

As mentioned above, the solutions $\bar{\rho}_i^n$ to (25) are integer-avelued at each iteration. However, for a general stepsize $a^n \in (0,1]$, the (relaxed) caching variables corresponding to the update in (17) may not be integer-valued at each iteration. In particular, this would be true if the stepsize follows a diminishing stepsize rule. Although one can explore rounding techniques and probabilistic caching techniques to obtain feasible integer-valued caching variables $x_i^n(k)$ from continuous-valued relaxed caching variables $\rho_i^n(k)$ [13], this would entail additional computational and communication complexity.

Since some embodiments include distributed, low-complexity forwarding and caching methods, some embodiments require $\rho_i^n(k)$ to be either 0 or 1 at each iteration n. This is realized by choosing the stepsize $a^n=1$ for all n. In this case, the update equation (17) is reduced to:

$$\Phi^{n+1}=\bar{\Phi}^n. \quad (27)$$

where $\bar{\Phi}^n$ is the solution to (21) and (25). That is, the solutions to the direction finding subproblems provide us with forwarding and caching decisions at each iteration. Some embodiments now summarize the remarkably elegant MinDelay forwarding and caching method.

MinDelay Forwarding Method:

At each iteration n, each node i and for each object k, the forwarding method chooses the outgoing link (i, m) to forward requests for object k, where m is chosen according to $$m \in \arg\min_{j \in O(i,k)} \delta_{ij}^n(k). \quad (28)$$

That is, requests for object k are forwarded on an outgoing link with the minimum marginal forwarding cost.

MinDelay Caching Method: At each iteration n, each node i calculates a cache score $CS^n(i,k)$ for each object k according to $$CS^n(i,k) \triangleq t_i^n(k)\delta_i^n(k). \quad (29)$$

where $\delta_i^n(k) = \min_{j \in O(i,k)} \delta_{ij}^n(k)$. Upon reception of data object $k_{new}$ not currently in the cache of node i, if the cache is not full, then $k_{new}$ is cached. If the cache is full, then $CS^n(i, k_{new})$ is computed, and compared to the lowest cache score among the currently cached objects, denoted by $CS^n(i, k_{min})$. If $CS^n(i, k_{new}) > CS^n(i, k_{min})$, then replace $k_{min}$ with $k_{new}$. Otherwise, the cache contents stay the same.

The cache score given in (29) for a given content k at node i is the minimum marginal forwarding cost for object k at i, multiplied by the total request rate for k at i. By caching the data objects with the highest cache scores, each node maximally reduces the total cost of forwarding request traffic.

One drawback of using stepsize $a^n=1$ in the MinDelay method is that it makes studying the asymptotic behavior of the method difficult. Nevertheless, in extensive simulations shown in the next section, it is shown that the method behaves in a stable manner asymptotically. Moreover, the MinDelay significantly outperform several state-of-the-art caching and forwarding methods in important operating regimes.

a) 5 Congestion Control

So far some embodiments include fixed per-node traffic rates, and thus, focused on developing optimal forwarding and caching methods. However, there are situations where the resulting network delay is excessive for given traffic rates even with optimal forwarding and caching strategies. In such scenarios, a congestion control mechanism must be deployed to limit traffic input into the network. As shown herein, some embodiments include an analytical framework that can be naturally extended to include congestion control.

i) 5.1 Optimization Problem: Node-Content utility, and Network Cost

For a given node-content tuple (i, k), let the utility level associated with an admitted rate to network of $r_i(k)$ be $U_{i,k}(r_i(k))$. Similar to [22], some embodiments consider maximizing the aggregate node-content utility minus the total network cost. That is, $$\max \Sigma_{i \in \mathcal{N}, k \in \mathcal{K}} U_{i,k}(r_i(k)) - \Sigma_{(i,j) \in \mathcal{E}} D_{ij}(F_{ij}) \quad (30)$$

Some embodiments assume node i has a maximum desired request rate for object k of $\bar{r}_i(k)$. The node-content utility $U_{i,k}(r_i(k))$ is then defined over the interval $[0, \bar{r}_i(k)]$, where it is assumed to be twice continuously differentiable, strictly increasing, and concave. Using the technique in [22], some embodiments define the overflow rate $f_{i,k} \triangleq (\bar{r}_i(k)-r_i(k))L$ for a given admitted rate $r_i(k) \leq \bar{r}_i(k)$. Similarly, let $\gamma_i(k) \triangleq f_{i,k}/(\bar{r}_i(k)L)$ be the portion of exogenous traffic being rejected. Clearly, $0 \leq \gamma_i(k) \leq 1$. Thus, at a given node i where $\bar{r}_i(k)>0$, some embodiments have $$t_i(k)=\bar{r}_i(k)(1-\gamma_i(k))+\Sigma_{i \in j(i,k)} t_i(k)(1-\rho_i(k))\phi_{ii}(k). \quad (31)$$

Let $B_{i,k}(f_{i,k}) \triangleq U_{i,k}(\bar{r}_i(k))-U_{i,k}(r_i(k))$ be the utility loss for node-content (i, k) which results from rejecting a rate of $f_{i,k}$ to the network. Then, the objective function in (30) can be re-written as $$\Sigma_{i \in \mathcal{N}, k \in \mathcal{K}} U_{i,k}(r_i(k)) - \Sigma_{(i,j) \in \mathcal{E}} D_{ij}(F_{ij}) = \Sigma_{i \in \mathcal{N}, k \in \mathcal{K}} U_{i,k}(\bar{r}_i(k)) - \Sigma_{i \in \mathcal{N}, k \in \mathcal{K}} B_{i,k}(f_{i,k}) - \Sigma_{(i,j) \in \mathcal{E}} D_{ij}(F_{ij}) \quad (32)$$

Since $\Sigma_{i \in \mathcal{N}, k \in \mathcal{K}} U_{i,k}(\bar{r}_i(k))$ is a constant, (30) is equivalent to $$\min \Sigma_{(i,j) \in \mathcal{E}} D_{ij}(F_{ij}) + \Sigma_{i \in \mathcal{N}, k \in \mathcal{K}} B_{i,k}(f_{i,k}) \quad (33)$$

subject to the same conditions as in (5) as well as the constraints, $0 \leq \gamma_i(k) \leq 1, \forall i, k$.

ii) 5.2 Joint Forwarding, Caching, and Congestion Control (JF3C) Problem

Following the discussion of the previous subsection, some embodiments include the Joint Forwarding, Caching, and Congestion Control (JF3C) problem to minimize the aggregate of total network cost and utility loss as it follows:

$$\begin{cases} \min D \triangleq \sum_{(i,j) \in \mathcal{E}} D_{ij}(F_{ij}) + \sum_{i \in \mathcal{N}, k \in \mathcal{K}} B_{i,k}(f_{i,k}) & (34) \\ \text{subject to:} \\ \sum_{j \in O} \phi_{ij}(k) = 1, i \in \mathcal{N}, k \in \mathcal{K} \\ \sum_{k \in \mathcal{K}} \rho_i(k) \leq c_i, \forall i \in \mathcal{N} \\ 0 \leq \rho_i(k) \leq 1, \forall i \in \mathcal{N}, k \in \mathcal{K} \\ 0 \leq \gamma_i(k) \leq 1, \forall i \in \mathcal{N}, k \in \mathcal{K} \\ \phi_{ij}(k) \geq 0, \forall (i,j) \in \mathcal{E}, k \in \mathcal{K} \end{cases}$$

Some embodiments use a similar technique applied to (5) here. Some embodiments relax the first two constraints and define $\lambda_{ik}$, and $\mu_i$ for $i \in \mathcal{N}$, $k \in \mathcal{K}$ as their Lagrange multipliers, respectively. Hence, the Lagrangian is formed as:

$$L(F,f,\lambda,\mu) = \Sigma_{(i,j) \in \mathcal{E}} D_{ij}(F_{ij}) + \Sigma_{i \in \mathcal{N}, k \in \mathcal{K}} B_{i,k}(f_{i,k}) - \Sigma_{i,k} \lambda_{ik} (\Sigma_j \phi_{ij}(k)-1) + \Sigma_i \mu_i (\Sigma_{k \in \mathcal{K}} \rho_i(k) - c_i). \quad (35)$$

subject to the following constraints:

$$0 \leq \rho_i(k) \leq 1, \forall i \in \mathcal{N}, k \in \mathcal{K},$$

$$0 \leq \gamma_i(k) \leq 1, \forall i \in \mathcal{N}, k \in \mathcal{K},$$

$$\phi_{ij}(k) \geq 0, \forall (i,j) \in \varepsilon, k \in \mathcal{K},$$

$$\mu_i \geq 0, \forall i \in \mathcal{N}.$$

It is easy to show that the necessary conditions for a local minimum of the problem with respect to variations in $\phi$ and $\rho$ are the same as the ones given in (11) and (12), respectively. Further, the necessary condition with respect to $\gamma$ is given as $$\frac{\partial D}{\partial \gamma_i(k)} \begin{cases} = 0, & \text{if } 0 < \gamma_i(k) < 1 \\ \geq 0, & \text{if } \gamma_i(k) = 0 \\ \leq 0, & \text{if } \gamma_i(k) = 1 \end{cases}. \quad (36)$$

Using straightforward calculations, it can be shown that the equations in (6) and (9) hold for the derivatives of the objective function of (34) with respect to $\phi$ and $\rho$. In addition, some embodiments have $$\frac{\partial D}{\partial \gamma_i(k)} = -(1 - \rho_i(k)) L \bar{r}_i(k) \sum_{j=O(i,k)} \phi_{ij}(k) \delta_{ij}(k) + \bar{r}_i(k) B'_{i,k}(f_{i,k}) L. \quad (37)$$

For a given node i with $\bar{r}_i(k) > 0$, substituting (37) in (36) results in $$B'_{i,k}(f_{i,k}) \begin{cases} = (1 - \rho_i(k))\delta_i(k), & \text{if } 0 < \gamma_i(k) < 1 \\ \geq (1 - \rho_i(k))\delta_i(k), & \text{if } \gamma_i(k) = 0 \\ \leq (1 - \rho_i(k))\delta_i(k), & \text{if } \gamma_i(k) = 1 \end{cases}. \quad (38)$$

By following the same reasoning made for the optimality conditions for the JFC problem, the sufficient conditions given in (14) and (15) along with the condition in (38) provide us with the optimality conditions for the JF3C problem.

iii) 5.3 Distributed Method for JF3C

As shown in the previous subsection, the optimality conditions for the forwarding and caching variables remain the same when the congestion control mechanism is added to the network model. This similarity also extends to the methods for the forwarding and caching methods proposed in section 4. In this section, some embodiments include similar settings as described in section 4, and extend the developed method to include congestion control mechanism. By incorporating the following mechanism, each requesting node will limit its traffic input in order to avoid excessive network costs (delay, or monetary costs).

Some embodiments extend the definitions of $\Phi^n$ and $\nabla D(\Phi^n)$ to include the congestion control variables and the corresponding derivatives at iteration n. It follows $$\Phi^n = \begin{bmatrix} (\phi_{ij}^n(k))_{j \in O(i,k), i \in N, k \in \mathcal{K}} \\ (\rho_i^n(k))_{i \in N, k \in \mathcal{K}} \\ (\gamma_i^n(k))_{i \in N, k \in \mathcal{K}} \end{bmatrix}. \quad (39)$$

and $$\nabla D(\Phi^n) \triangleq \begin{bmatrix} (\delta_{ij}^n(k))_{j \in O(i,k), i \in N, k \in \mathcal{K}} \\ \left( -\bar{t}_i^n(k) \sum_{j=O(i,k)} \phi_{ij}^n(k) \delta_{ij}^n(k) \right)_{i \in N, k \in \mathcal{K}} \\ \bar{r}_i(k) \begin{Bmatrix} B'_{i,k}(f_{i,k}^n) - \\ (1 - \rho_i^n(k)) \sum_{j=O(i,k)} \phi_{ij}^n(k) \delta_{ij}^n(k) \end{Bmatrix}_{i \in N, k \in \mathcal{K}} \end{bmatrix}.$$

Similarly, some embodiments use the conditional gradient method given in (17), and solve the direction finding subproblems (21), (25) and, $$\begin{cases} \min \sum_{(i,k)} v_i^n(k)(\gamma_i(k) - \gamma_i^n(k)) \\ \text{subject to:} \\ 0 \leq \gamma_i(k) \leq 1, \forall i \in \mathcal{N}, k \in \mathcal{K} \end{cases} \quad (40)$$

where $$v_i^n(k) = \bar{r}_i(k) \left\{ B'_{i,k}(f_{i,k}^n) - (1 - \rho_i^n(k)) \sum_{j=O(i,k)} \phi_{ij}^n(k) \delta_{ij}^n(k) \right\}.$$

It is easy to verify that for a given node i, an optimal solution to (40) has zero coordinates $\forall k$ such that $v_i^n(k) >= 0$ and coordinates equal to one $\forall k$ such that $v_i^n(k) < 0$.

This solution, together with the solutions to subproblems (21) and (25), construct $\bar{\Phi}^n$. Following the argument in section 4 regarding the stepsize $a^n$, some embodiments set $a^n=1$ for caching and forwarding methods, however, setting $a^n=1$ for the congestion control method is not a favorable choice. Thus, some embodiments use a smaller value for $a^n$ in this case. Let $a^n$ be the proposed stepsize vector. Therefore, the JF3C method is given by $$\Phi^{n+1} = \Phi^n + a^n(\bar{\Phi}^n - \Phi^n). \quad (41)$$

6 Simulation Experiments

In this section some embodiments include the results of extensive simulations performed using some embodiments' own Java-based ICN Simulator. Three existing methods are compared against the MinDelay method of some embodiments. First, some embodiments consider the VIP joint caching and forwarding method introduced in [23]. This method uses a backpressure (BP)-based method for forwarding and a stable caching method, both based on VIP (Virtual Interest Packet) queue states [23]. In the VIP method discussed in [23], multiple Interest Packets requesting the same Data Packet are aggregated. Some embodiments compare MinDelay with a version of VIP without Interest aggregation, labeled BP.

The other two approaches implemented here are based on the LFU cache eviction policy. We note that for stationary input request processes, the performance of LFU is typically much better than those of LRU and FIFO. Initially we included LRU-based approaches. However, since their performance was much worse than the competitors, we omitted them in the final figures. In the first approach, denoted by LFUM-PI, multipath request forwarding is based on the method proposed in [6]. Here, the forwarding decision is made as follows: an Interest Packet requesting a given object is forwarded on an outgoing interface with a probability inversely proportional to the number of Pending Interest (PI) Packets for that object on that outgoing interface. The second LFU-based approach implemented here, denoted by LFUM-RTT, has a RTT-based forwarding strategy. In this strategy, described in [11], the multipath forwarding decision is based on the exponentially weighted moving average of the RTT of each outgoing interface per object name. An Interest Packet requesting an object is forwarded on an outgoing interface with a probability inversely proportional to the average RTT recorded for that object on that outgoing interface.

The MinDelay forwarding and caching method was tested against the described approaches on several well-known topologies depicted in FIGS. 2A-F. The following explains the simulation scenarios and results in detail.

i) 6.1 Simulation Details

Each simulation generates requests for 1000 seconds and terminates when all the requested packets are fulfilled. During the simulation, a requesting node requests a content object by generating an Interest Packet containing the content name and a random nonce value, and then submits it to the local forwarder. Upon reception of an Interest Packet, the forwarder first checks if the requested content name contained in the Interest Packet is cached in its local storage. If there is a copy of the content object in the local storage, it generates a Data Packet containing the requested object, along with the content name and the nonce value, and puts the Data Packet in the queue of the interface on which the Interest Packet was received. If the local cache does not have a copy of the requested object, the forwarder uses the FIB table to retrieve the available outgoing interfaces. In the simulations, we ensured that loop-free routing was done prior to the forwarding and caching experiments. The results of the routing method are saved in FIB tables at each node. Then, the forwarder selects an interface among the available interfaces based on the implemented forwarding strategy. In particular, for MinDelay, some embodiments update the marginal forwarding costs given in (22) at the beginning of each update interval (with a length between 2-5 seconds), and cache the results in a sorted array for future use. Hence, the forwarding decision given in (28) takes O(1) operations.

After selecting the interface based on the considered forwarding strategy, the forwarder creates a Pending Interest Table (PIT) entry with the key being the content name concatenated with the nonce value, and the PIT entry value being the incoming interface ID. Note that some embodiments concatenate the nonce value to the content name since embodiments may not assume Interest Packet suppression at the forwarder. Hence, some embodiments have distinguishable keys for each Interest Packet. Next, the forwarder assigns the Interest Packet to the queue of the selected interface, to be transmitted in a FIFO manner.

Upon reception of a Data Packet, the forwarder first checks if the local storage is full. If the storage is not full, it will cache the contained data object in local storage. In the experiments, all data objects contain one chunk, or one Data Packet. If the storage is at capacity, it uses the considered cache eviction policy to decide whether to evict an old object and replace it with the new one. In the case of MinDelay, the forwarder regularly updates the cache score of the currently-cached contents using (29) at the beginning of the update intervals and keeps a sorted list of the cached content objects using a hash table and a priority queue. When a new Data Packet arrives, the forwarder computes its cache score, and compares the score with the lowest cache score among the currently-cached content objects. If the score of the incoming Data Packet is higher than the current lowest cache score, the forwarder replaces the corresponding cached object with the incoming one. Otherwise, the cached contents remain the same.

Finally, the forwarder proceeds by retrieving and removing the PIT entry corresponding to the Data Packet and assigning the Data Packet to the queue of the interface recorded in the PIT entry.

In all topologies, the number of content objects is 5000. Each requester requests a content object according to a Zipf distribution with power exponent $\alpha=0.75$, by generating an Interest Packet each of size 1.25 KBytes. All content objects are assumed to have the same size and can be packaged into a single Data Packet of size 500 KBytes. The link capacity of all the topologies, except in Abilene topology illustrated in FIG. 2A, is 50 Mbps.

Figure 2A:
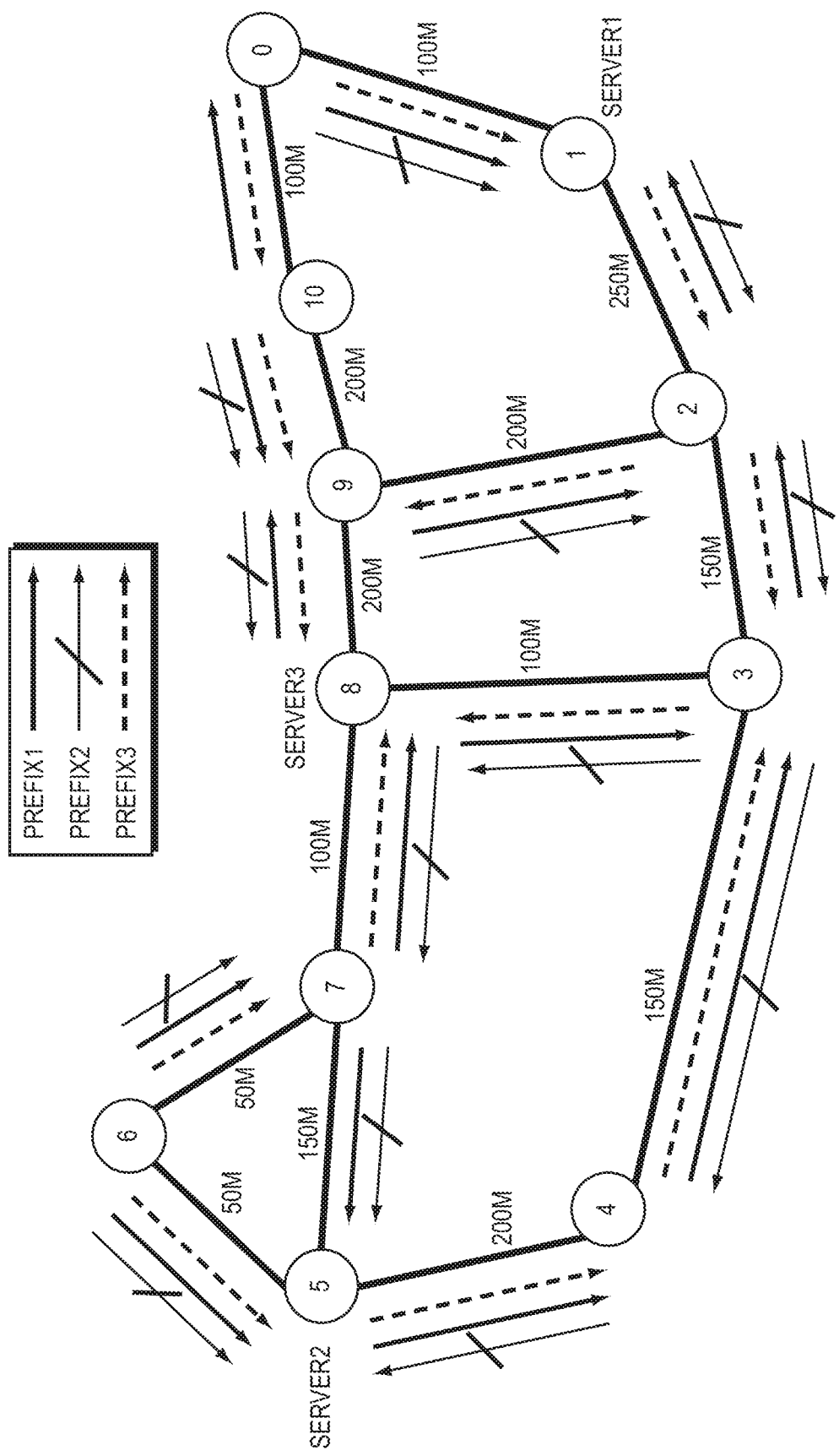
FIGS. 2A-2F illustrate various network topologies in which some embodiments may be configured to operate.

Some embodiments consider the Abilene topology [6] depicted in FIG. 2A. There are three servers, at nodes 1, 5, and 8, each serving ⅓ of the content objects. That is, object k is served by server k mod 3+1 for k=1, 2, . . . , 5000. The other eight nodes of the topology request objects according to Zipf distribution with $\alpha=0.75$. Also, each requester has a content store of size 250 MBytes, or equivalently 500 content objects.

Figure 2B:
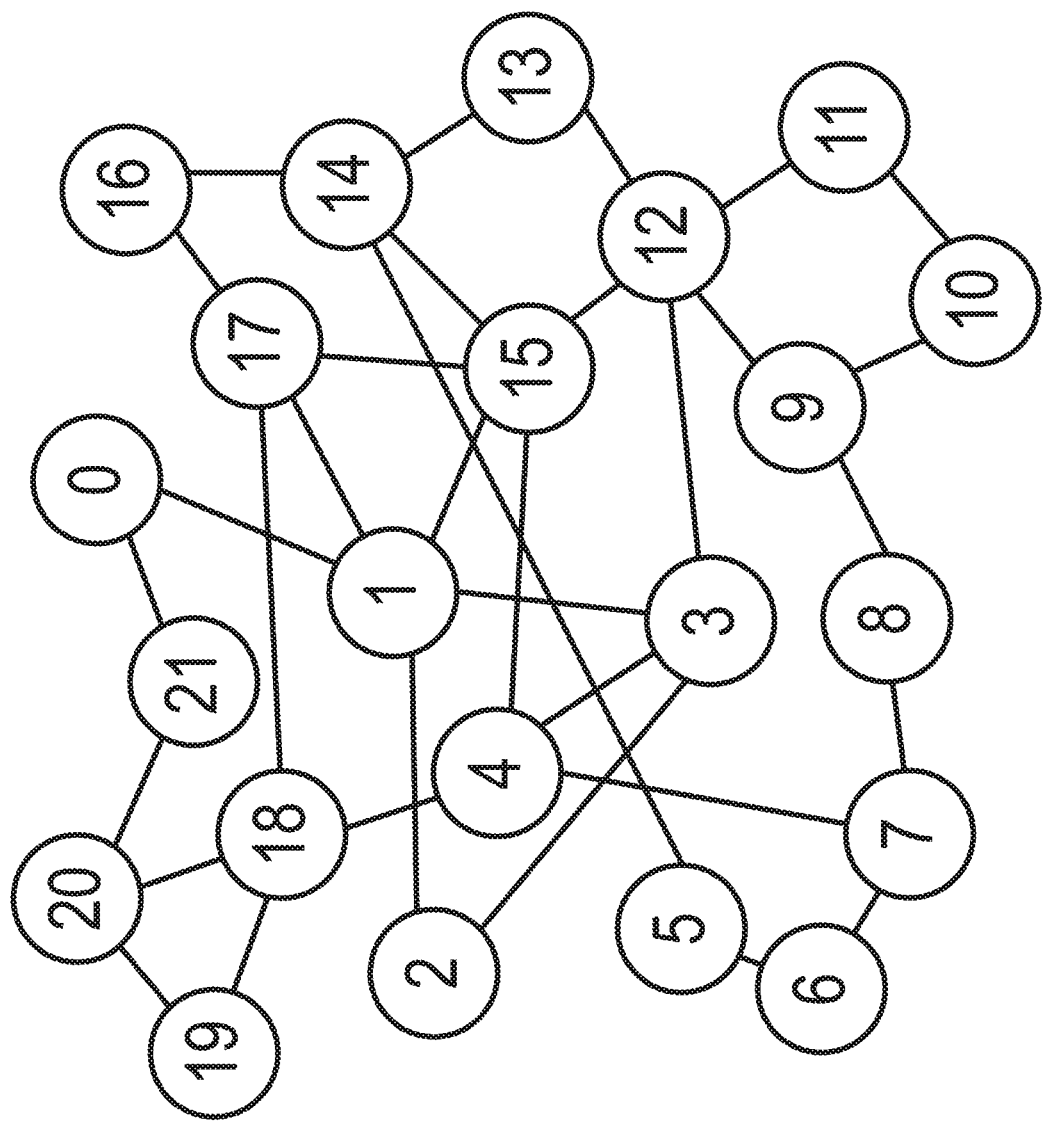

In the GEANT topology, illustrated in FIG. 2B, there are 22 nodes in the network. All nodes request content objects. Each content object is randomly assigned to one of the 22 nodes as its source node. Each node has a content store of size 250 MBytes, or equivalently 500 content objects.

Figure 2C:
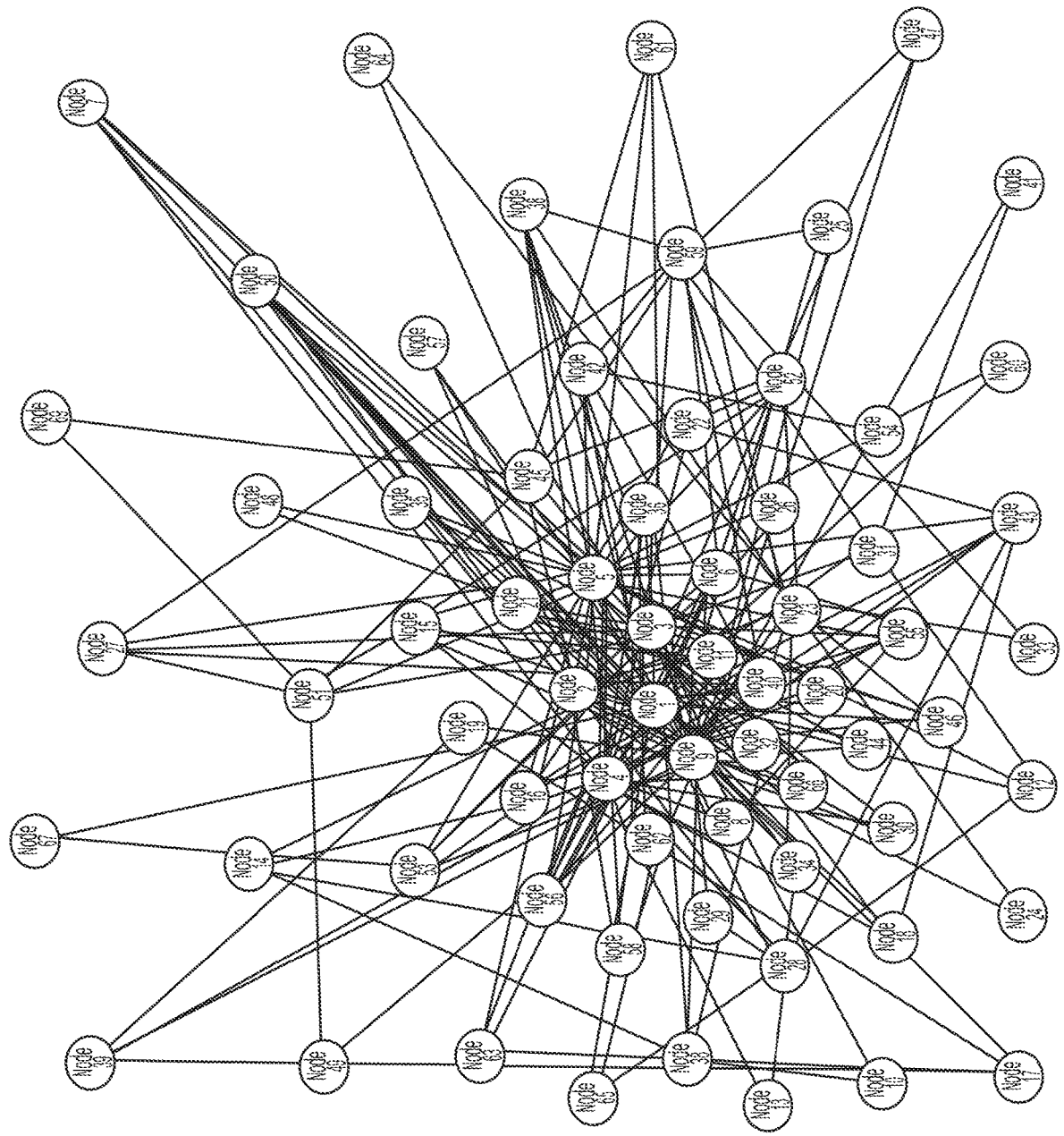

In the DTelekom topology, illustrated in FIG. 2C, there are 68 nodes in the network. All nodes request content objects. Each content object is randomly assigned to one of the 68 nodes as its source node. Each node has a content store of size 250 MBytes, or equivalently 500 content objects.

Figure 2D:
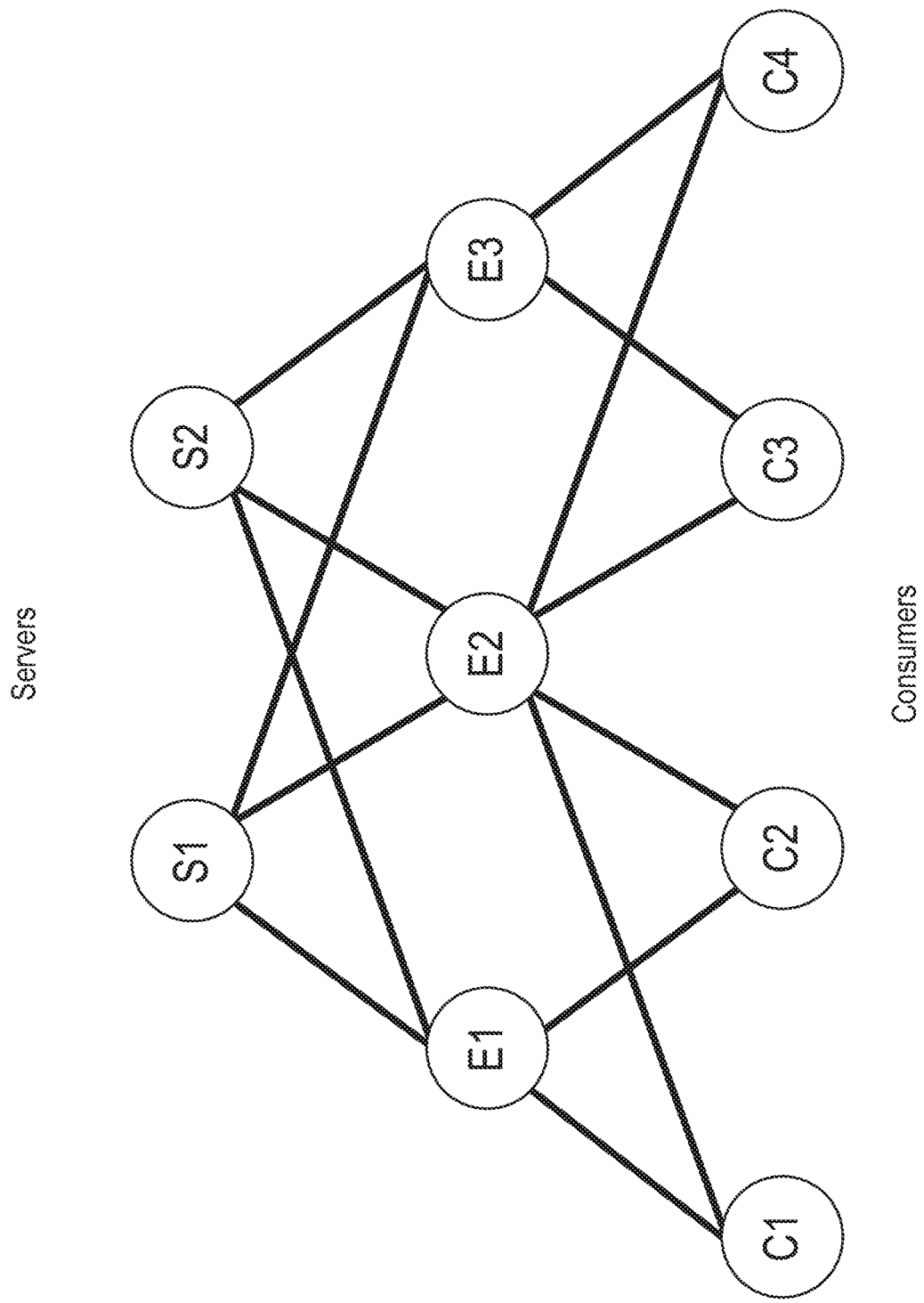

In the Tree topology, depicted in FIG. 2D, there are four requesting nodes at the leaves, C1, C2, C3 and C4. There are three edge nodes, E1, E2, and E3. Each content object is randomly assigned to one of the two source nodes, S1 and S2. Each requesting and edge node has a content store of size 125 MBytes, or equivalently 250 content objects.

Figure 2E:
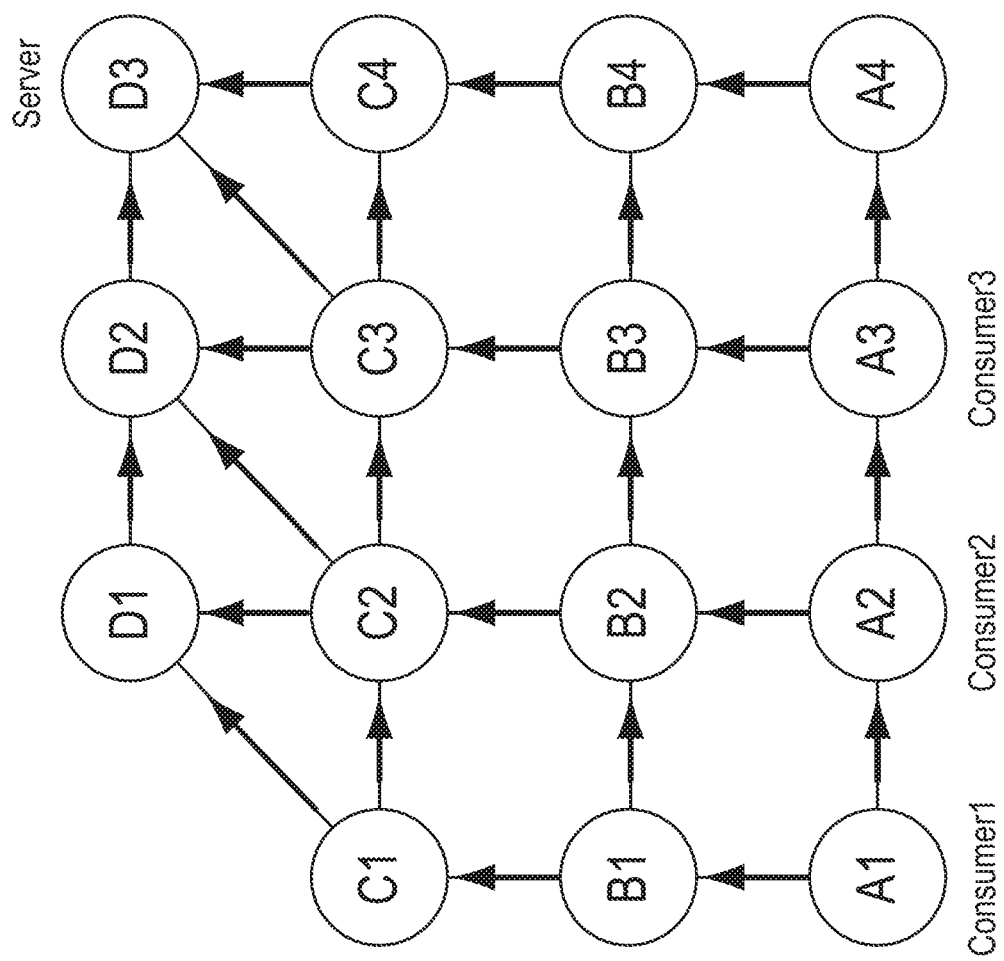

In the Ladder topology [6], depicted in FIG. 2E, there are three requesting nodes, A1, A2 and A3. The source of all the content objects are at node D3. Each node in the network, except node D3, has a content store of size 125 MBytes, or equivalently 250 content objects.

Figure 2F:
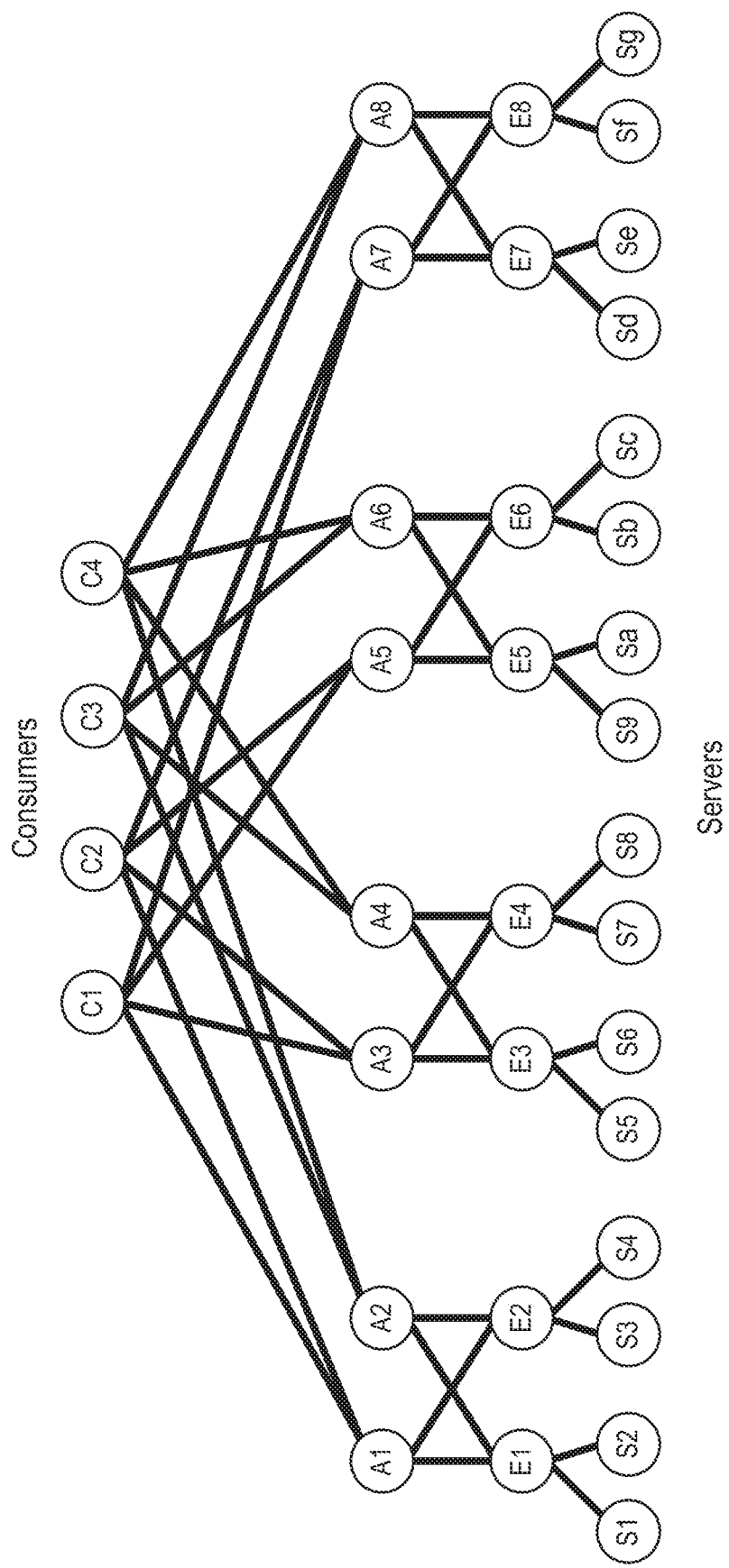
Figure 3A:
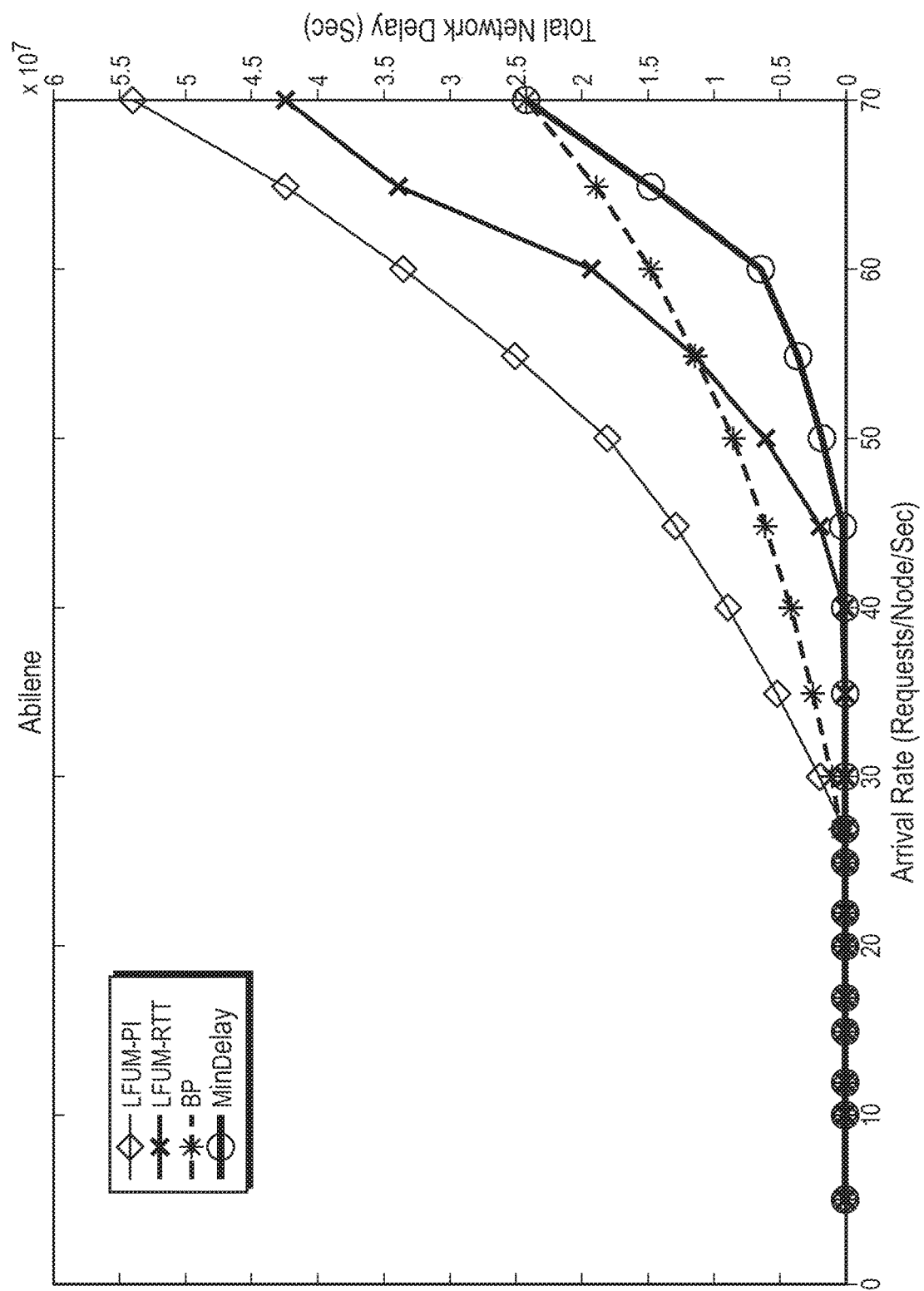
FIGS. 3A-3F illustrate graphs of total network delay versus arrival rate for the topologies of FIGS. 2A-2F, according to some embodiments.
Figure 3B:
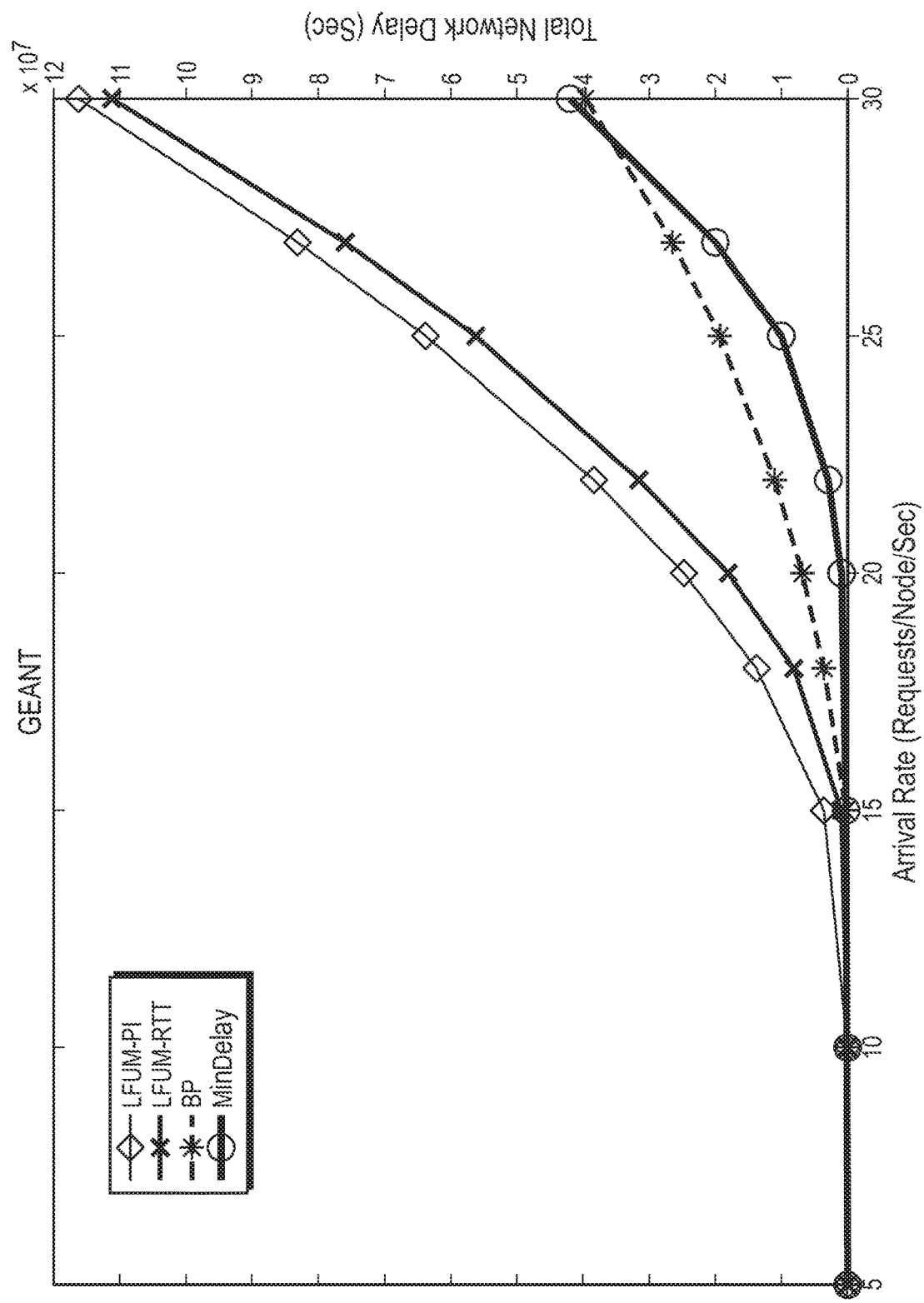
Figure 3C:
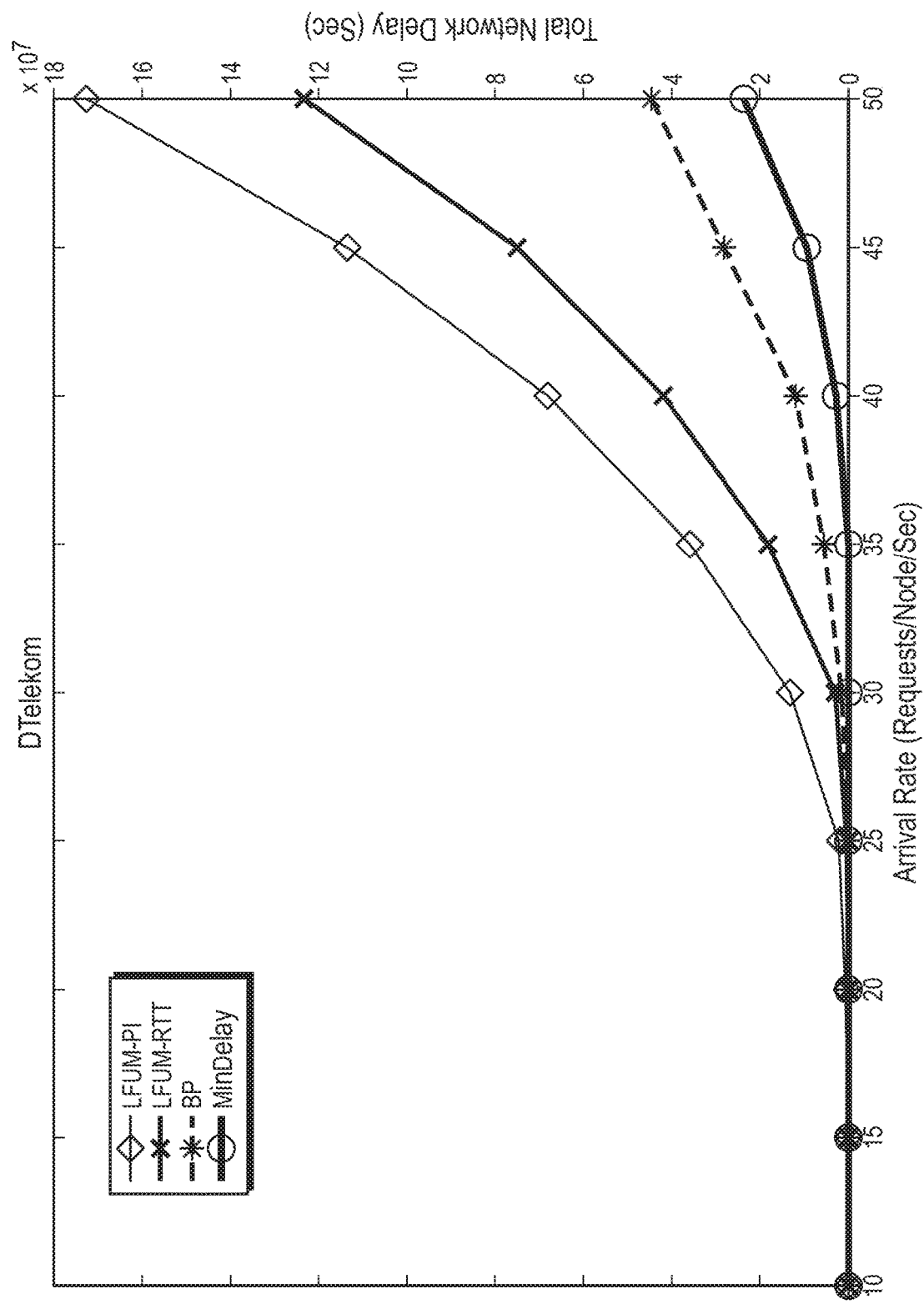
Figure 3D:
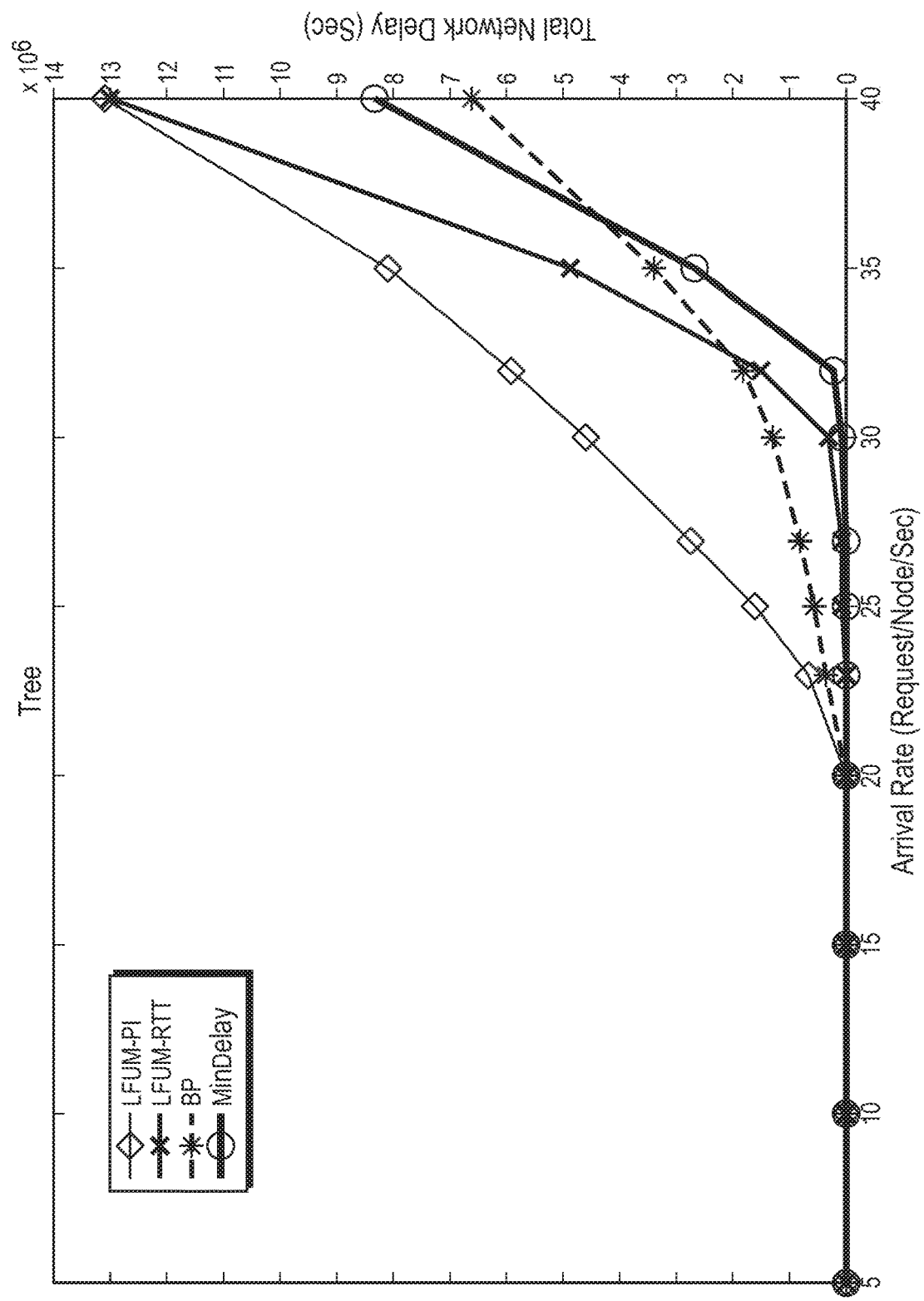
Figure 3E:
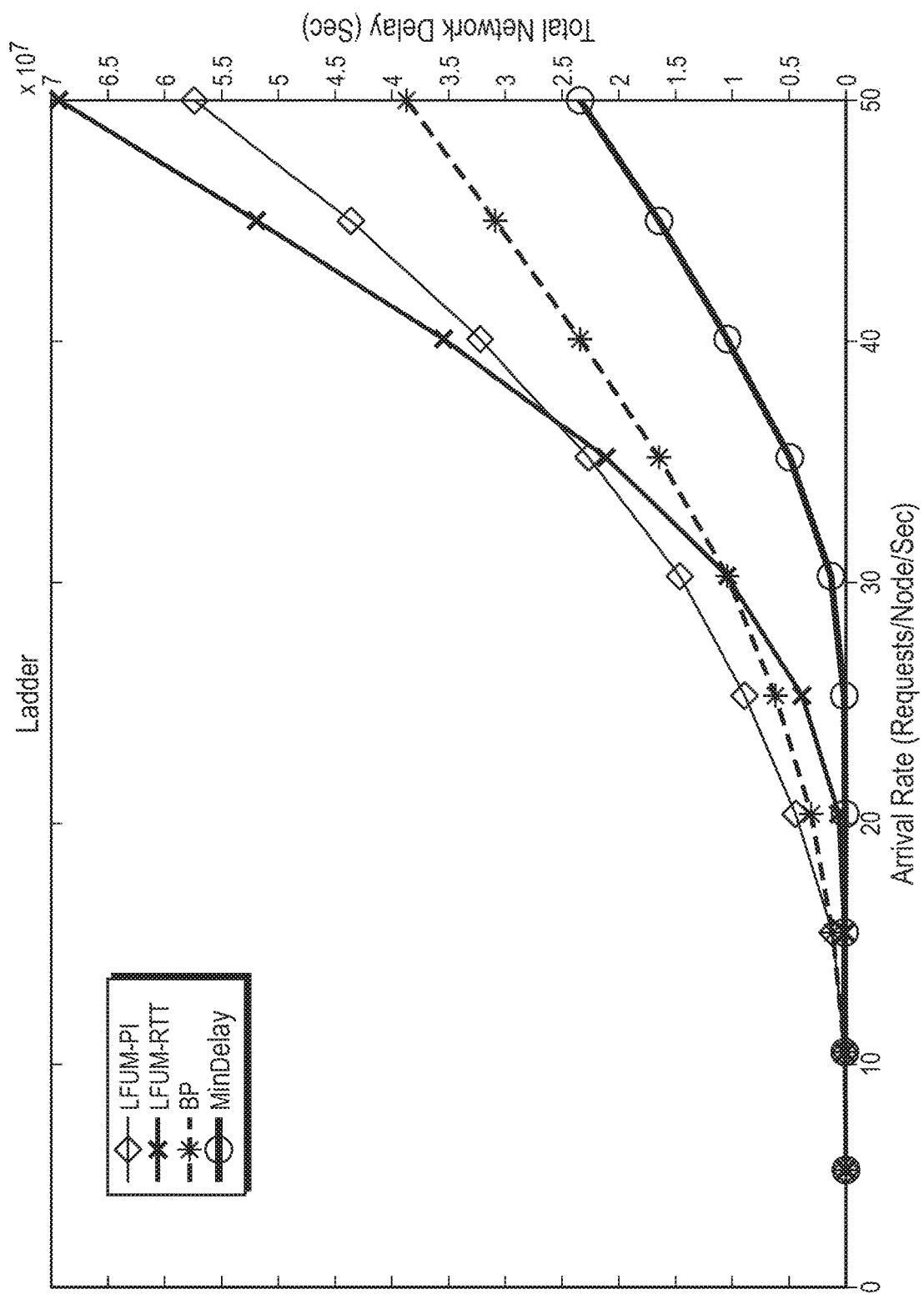
Figure 3F:
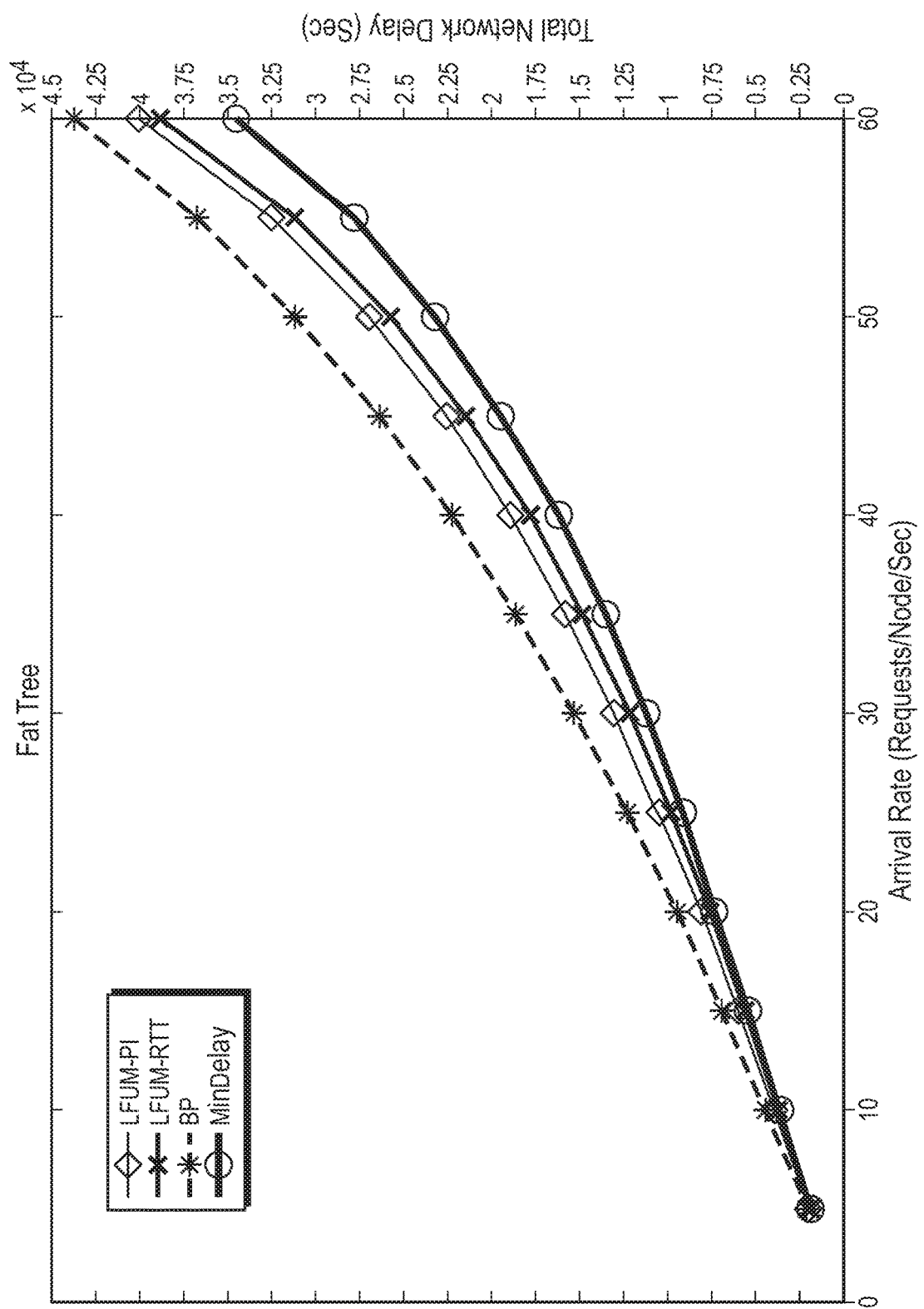
Figure 4A:
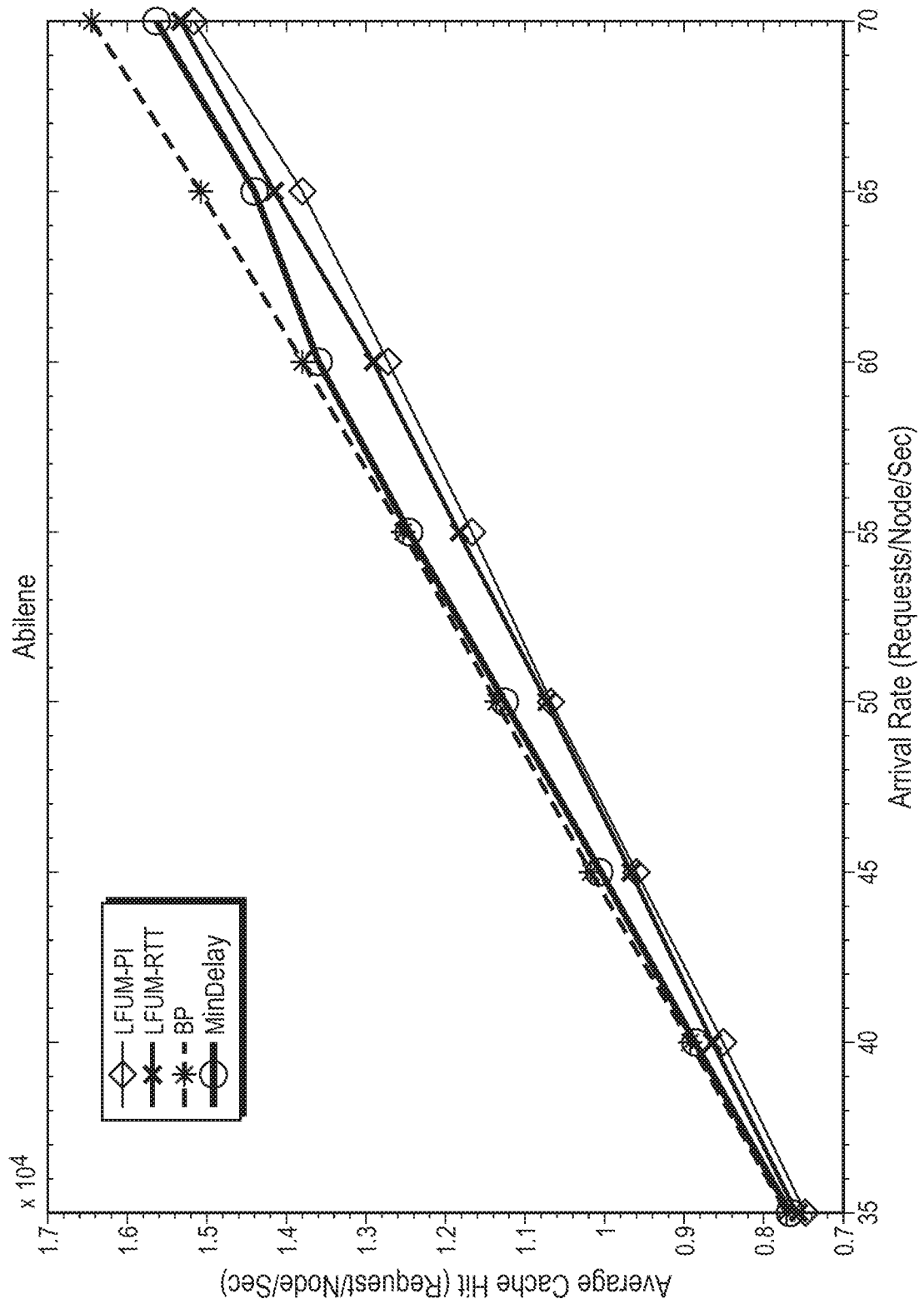
FIGS. 4A-4D illustrate graphs of average cache hit rate versus arrival rate for the topologies of FIGS. 2A, 2B, 2D, and 2E, according to some embodiments.
Figure 4B:
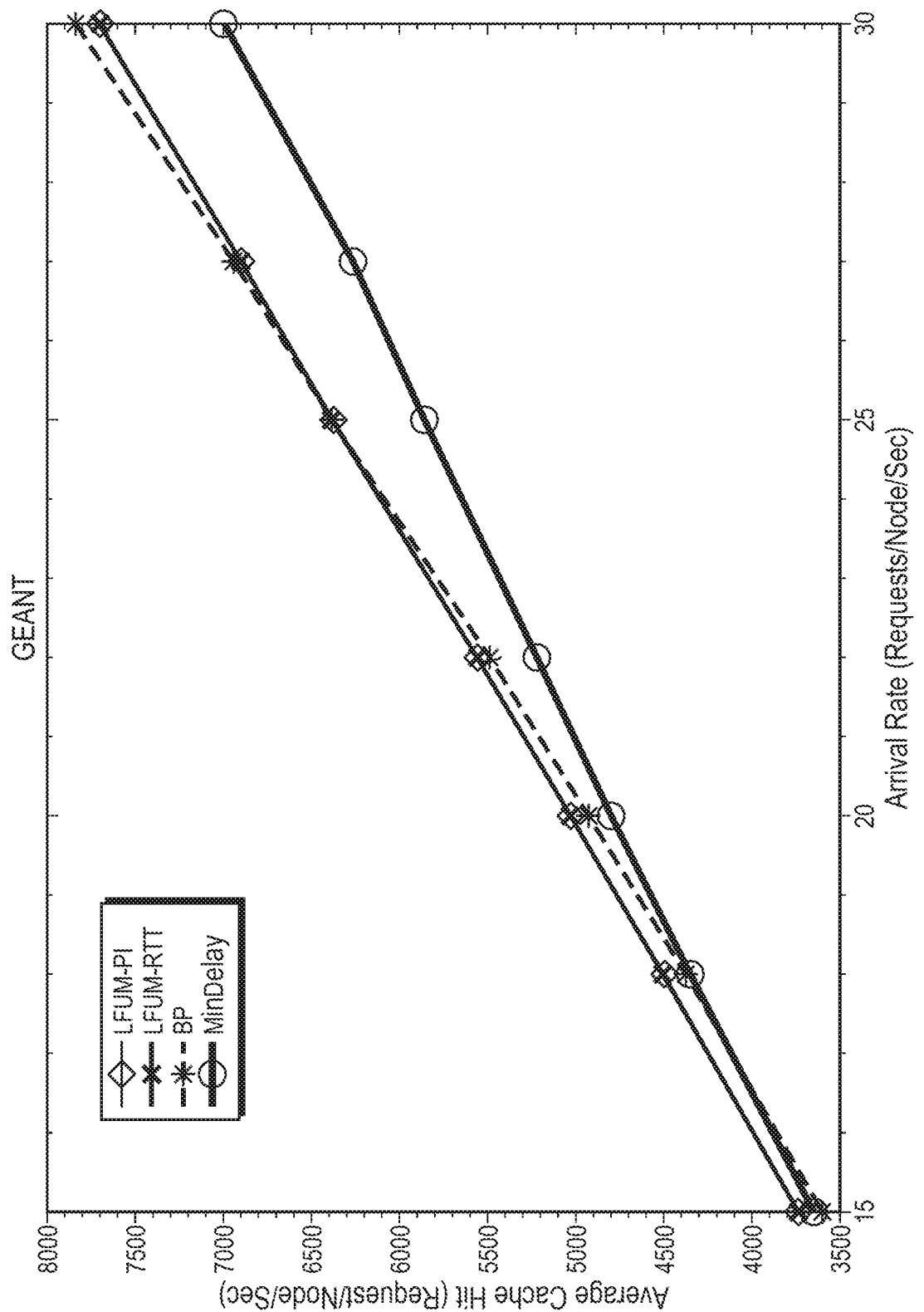
Figure 4C:
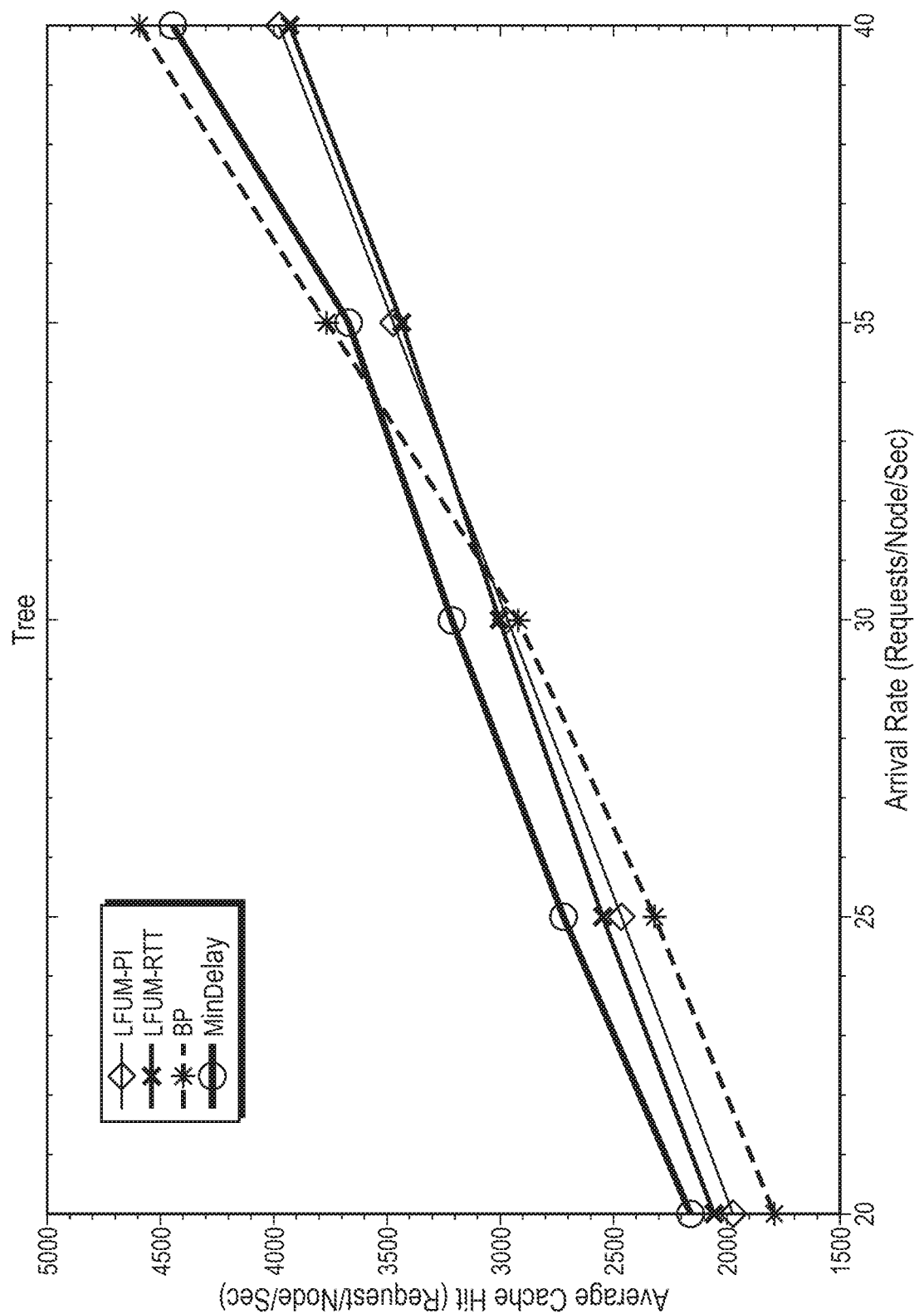
Figure 4D:
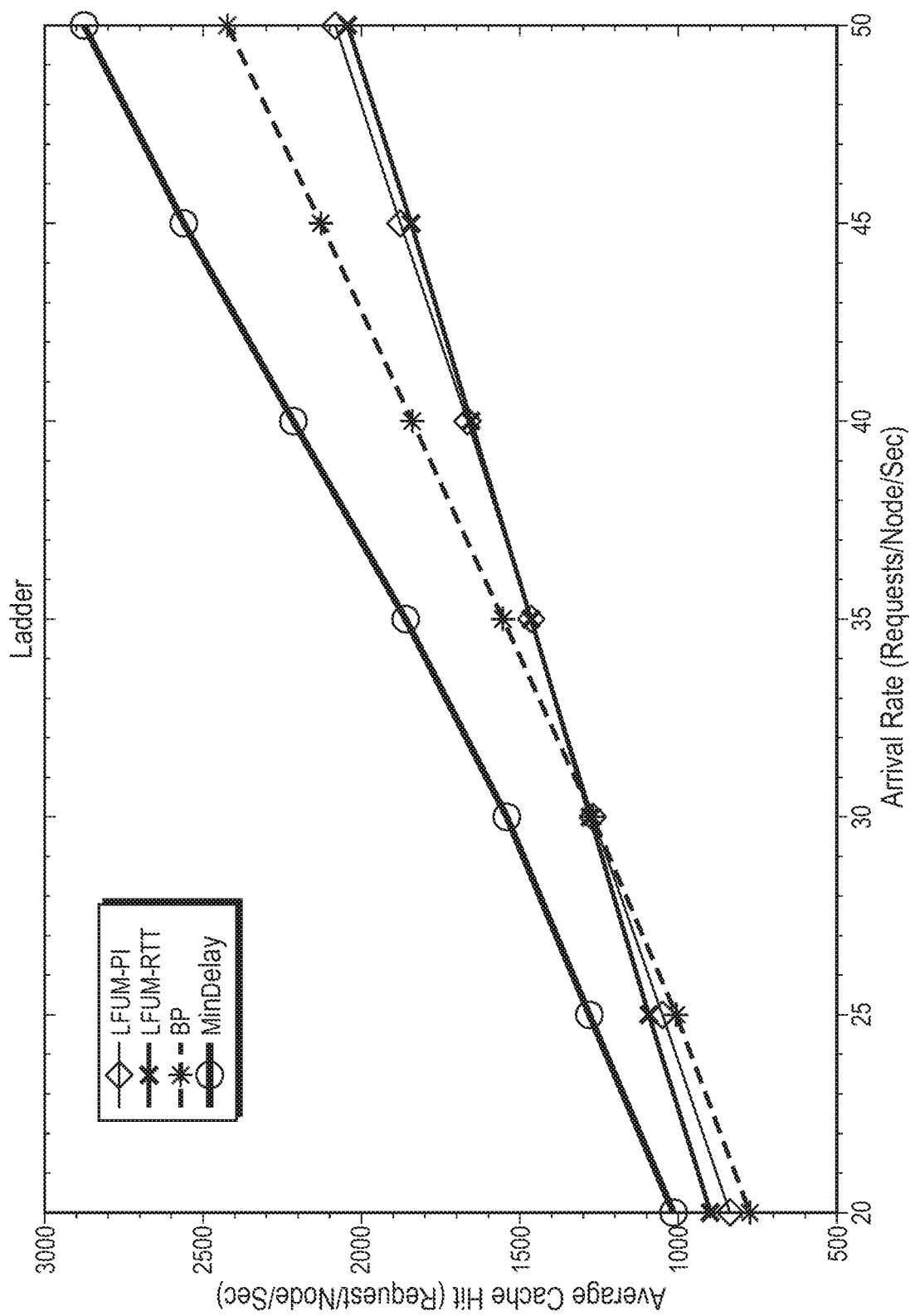

Finally, in the Fat Tree topology, depicted in FIG. 2F, requesters are at the roots, i.e., nodes C1, C2, C3 and C4. There are 16 servers at the leaves. In this topology, each content object is randomly assigned to two servers, one chosen from the first 8 servers, and the other from the second 8 servers. All the requesting nodes as well as Aggregation and Edge nodes have a content store, each of size 125 MBytes, or equivalently 250 content objects.

ii) 6.2 Simulation Results

In FIGS. 3A-3F and 4A-4D, the results of the simulations are plotted. The figures illustrate the performance of the implemented methods in terms of total network delay for satisfying all generated requests (in seconds) and the average cache hits in requests/node/second, versus the arrival rate in requests/node/second, respectively. Some embodiments define the delay for a request as the difference between the creation time of the Interest Packet and the arrival time of its corresponding Data Packet at the requesting node. A cache hit for a data object is recorded when an Interest Packet reaches a node which is not a content source but which has the data object in its cache. When a cache hit occurs, the corresponding metric is incremented one.

Figure 5:
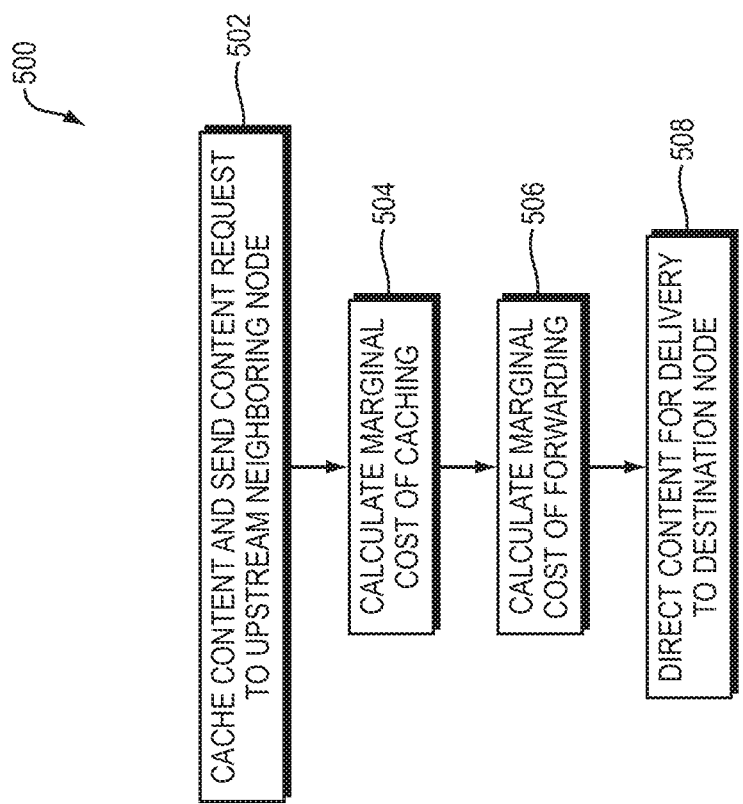
FIG. 5 is a flow diagram illustrating an example embodiment of a method of the present disclosure.

To reduce randomness in results, each simulation was run 10 times, each with a different seed number, and plotted the average performance of each method in FIGS. 5.3 and 5.3.

FIGS. 3A-F show the total network delay in seconds versus the per-node arrival rate in request/seconds, for the above-mentioned topologies. As can be seen, in all the considered topologies, MinDelay has lower delay in the low to moderate arrival rate regions. In the higher arrival rate regions, BP's outperforms MinDelay in 3 of the tested topologies (Abilene, GEANT, and Tree), As shown in [23], the BP performs well in high arrival rate regions since the VIP method adaptively maximizes the throughput of Interest Packets, thereby maximizing the stability region of user demand rates satisfied by the network. When the network is operating well within the stability region, however, MinDelay typically has superior performance. Thus, the MinDelay and VIP methods complement each other in delivering superior delay performance across the entire range of request arrival rates.

Finally, FIGS. 4A-D depict the average total cache hits of the network (in requests/node/second) versus the per-node arrival rate (in request/seconds) for the Abilene, GEANT, Tree, and Ladder topologies, respectively. It can be seen that the cache hit performance of MinDelay is competitive but not necessarily superior to those of the other methods. This follows form the fact that MinDelay is designed with the objective of decreasing total network delay, and not explicitly with the objective of increasing cache hits.

a) 7 Conclusion

Some embodiments include a new unified framework for minimizing congestion-dependent network cost by jointly choosing node-based forwarding and caching variables. Relaxing integer constraints on caching variables, some embodiments used a version of the conditional gradient method to develop MinDelay, an adaptive and distributed joint forwarding and caching method for the original mixed-integer optimization problem. The MinDelay method elegantly yields feasible routing variables and integer caching variables at each iteration, and can be implemented in a distributed manner with low complexity and overhead.

Simulation results show that while the VIP method performs well in high request arrival rate regions, MinDelay typically has significantly better delay performance in the low to moderate request rate regions. Thus, the MinDelay and VIP methods complement each other in delivering superior delay performance across the entire range of request arrival rates.

The elegant simplicity and superior performance of the MinDelay method raise many interesting questions for future work. Specifically, some embodiments include method that are analytically characterizing the time-asymptotic behavior of MinDelay, as well as providing guarantees on the gap between the MinDelay performance and the theoretically optimal performance for the joint forwarding and caching problem.

Method, Network, and System:

FIG. 5 is a flow diagram illustrating an example embodiment of a method 500 of the present disclosure. In some embodiments, a network includes nodes communicatively coupled to neighboring nodes via respective links in the network.

As illustrated in FIG. 5, in some embodiments, the method 500 caches a unit of content and sends a content request to an upstream neighboring node to request the unit of content if not cached (502). In the method, a network may include nodes communicatively coupled to neighboring nodes via respective links in the network.

The method 500 may calculate, by a given node among the nodes, a (i) marginal cost of caching the unit of content (504). The method 500 may calculate, by a given node among the nodes, a (ii) marginal cost of forwarding the content request to at least one neighbor node (506).

At least one of the (1) the marginal cost of the forwarding the content request, and (2) the marginal cost of the caching the unit of content, may be dependent on both link congestion between the given node and the at least one neighboring node and link congestion on links of an upstream path of nodes toward and including a source node.

The source node may be guaranteed to have the unit of content available. Each node along the upstream path may be configured to perform a respective calculation of the cost and to report same to its downstream neighboring node making the content request. The method 500 may direct, by the given node, content of the unit of content for delivery to a destination node (508).

According to some embodiments, with respect to FIG. 5, when a request packet (interest packet) arrives at a node, the node first checks, by the method 500, whether the requested content is cached locally. If so, the content can be retrieved and sent to the requester on the reverse path by the method 500. Otherwise, a node may send the request further upstream toward the data source, using a forwarding method. As the content travels on the reverse path toward the requester, each node on the reverse path may decide whether to cache the content or not, according to a caching method.

Figure 6:
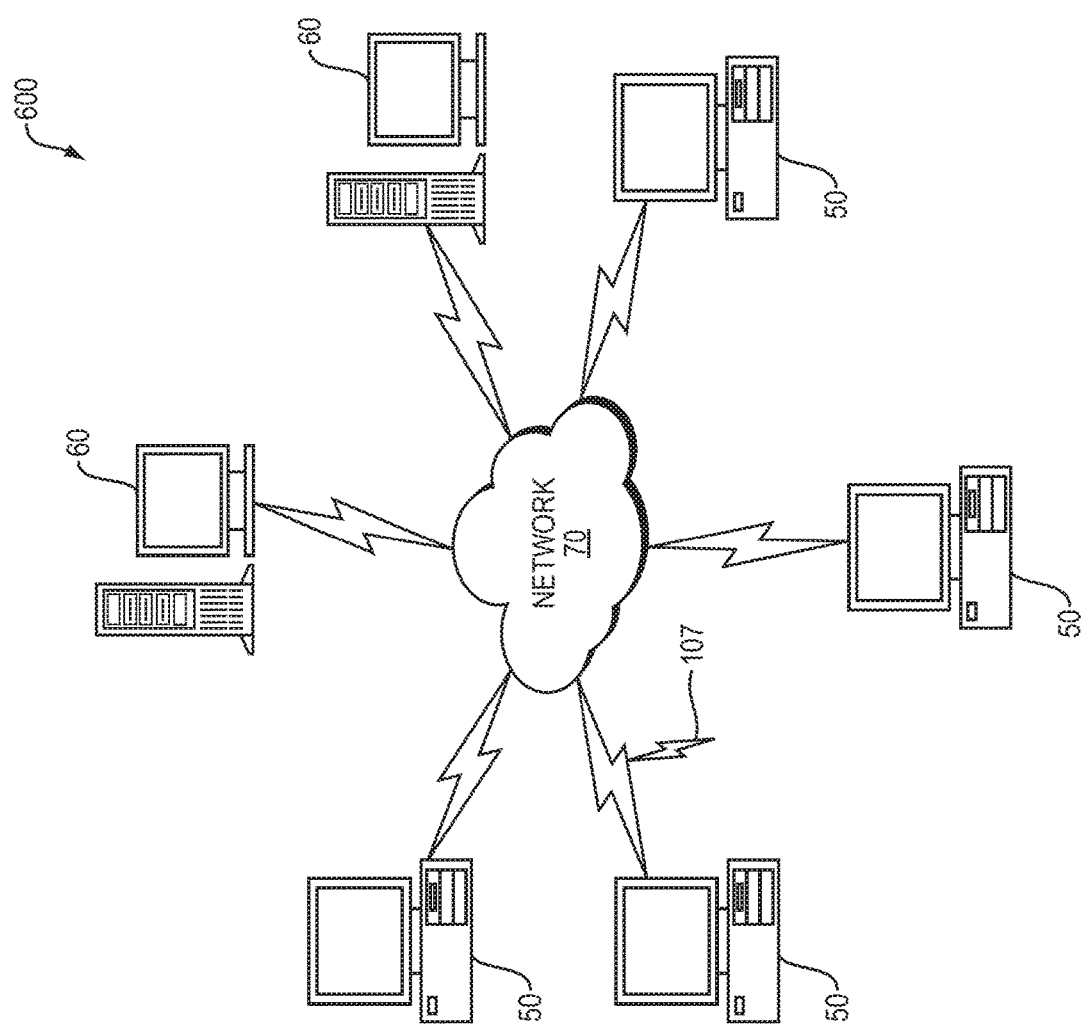
FIG. 6 is a network diagram that illustrates a computer network or similar digital processing environment in which embodiments of the present disclosure may be implemented.

FIG. 6 is a network diagram that illustrates a computer network or similar digital processing environment 600 in which embodiments of the present disclosure may be implemented. Client computer(s)/devices 50 (e.g., computing devices/display devices) and server computer(s) 60 (e.g., a Cloud-based service) provide processing, storage, and input/output devices executing application programs and the like. The client computer(s)/devices 50 (e.g., computing devices/display devices) can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, BLUETOOTH™, etc.) to communicate with one another. Other electronic device/computer network architectures are suitable. According to some embodiments, caching and forwarding may be performed in distributed locations (i.e., at each network node).

Figure 7:
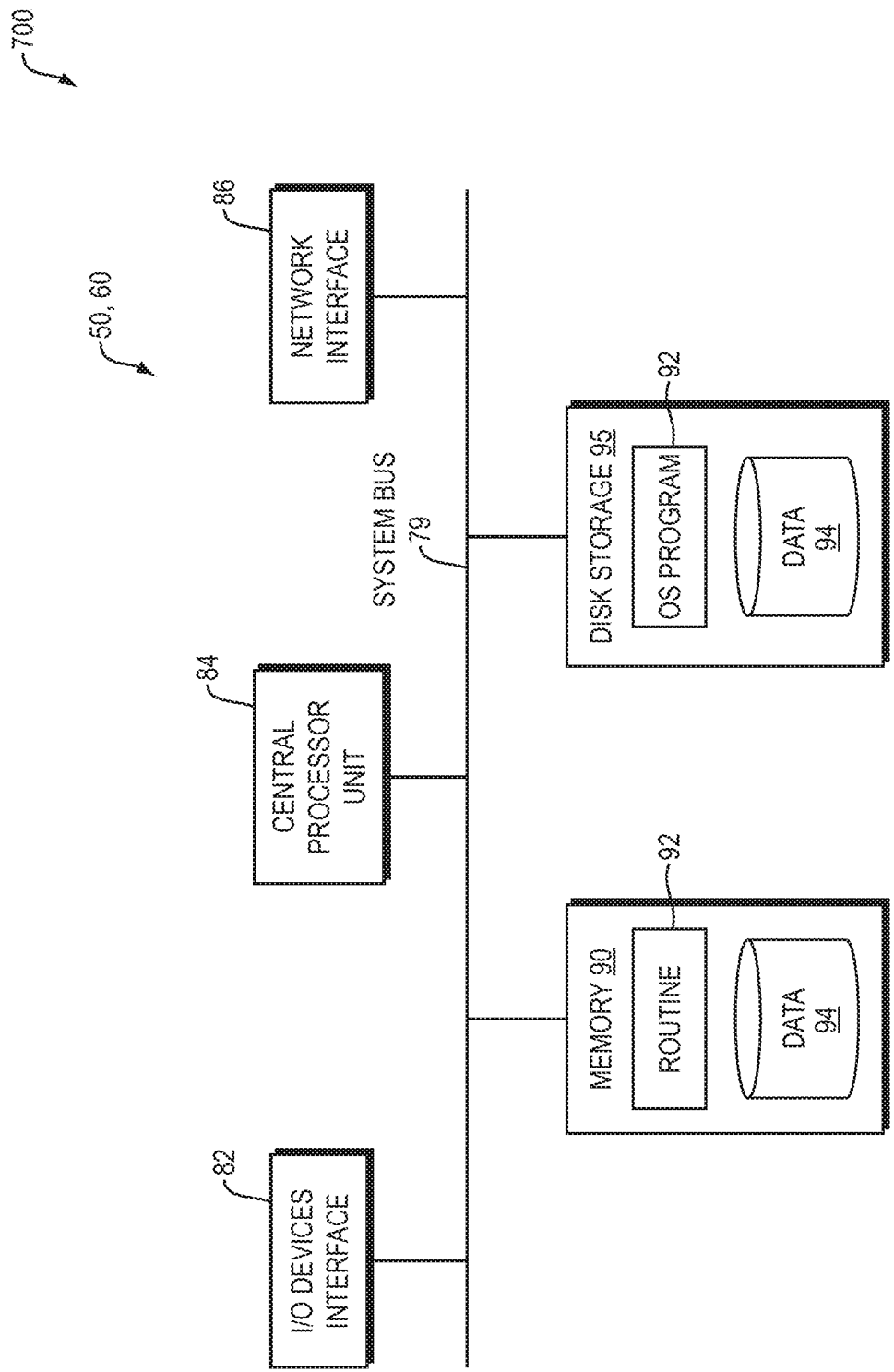
FIG. 7 is a block diagram of an example internal structure of a computer (e.g., client processor/device or server com-

FIG. 7 is a block diagram of an example internal structure of a computer (e.g., client processor/device 50 or server computers 60) in the computer system or apparatus of FIG. 6. Each computer 50, 60 includes a system bus 79, where a bus is a set of hardware lines used for data transfer among the components (e.g., entities) of a computer or processing system or apparatus. The system bus 79 is essentially a shared conduit that connects different elements of a computer system or apparatus (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, touchscreen etc.) to the computer 50, 60. A network interface 86 allows the computer to connect to various other devices attached to a network (e.g., network 70 of FIG. 6). Memory 90 provides volatile storage for computer software instructions 92 and data 94 used to implement embodiments of the present disclosure (e.g., including but not limited to including any of the processor, memory, or any other device, engine, system, module, or controller described herein). Disk storage 95 provides non-volatile storage for computer software instructions 92 and data 94 used to implement some embodiments of the present disclosure. Note, data 94 may be the same between a client 50 and server 60, however, the type of computer software instructions 92 may differ between a client 50 and a server 60. A central processor unit 84 is also attached to the system bus 79 and provides for the execution of computer instructions.

As illustrated in FIG. 7, in an embodiment, the system or apparatus 800 includes a processor 84 and a memory 90 with computer code instructions stored therein. The memory 90 is operatively coupled to the processor 84 such that the computer code instructions configure the processor 84 to implement content delivery.

In some embodiments, the network of FIG. 6 includes network nodes 50 configured to cache content and to route a unit of content in response to a user request to deliver at least the unit of content to a destination node 60. The controller (which may be implemented as processor unit 84 of FIG. 7) may be configured to cause at least a subset of the network nodes 50 to adapt caching and forwarding decisions. The controller (processor unit 84 of FIG. 8) may be configured to cause at least the subset of the network nodes 50 to adapt the caching and forwarding decisions in a manner that jointly considers caching and forwarding parameters to deliver at least the unit of content to the destination node 60.

Referring back to FIG. 7, in some embodiments, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the disclosure system. Computer program product 92 may be installed by any suitable software installation procedure, as is well known in the art. In another embodiment, at least a portion of the software instructions may also be downloaded over a cable, communication or wireless connection. In other embodiments, the disclosure programs are a computer program propagated signal product 107 (shown in FIG. 6) embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present disclosure routines/program 92.

Embodiments or aspects thereof may be implemented in the form of hardware (including but not limited to hardware circuitry), firmware, or software. If implemented in software, the software may be stored on any non-transitory computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, or some combination thereof, and, thus, the data processors described herein are intended for purposes of illustration only and not as a limitation of the embodiments.

While this disclosure has been particularly shown and described with references to example embodiments thereof, it will be understood by those skilled in the art that various changes in form and details may be made therein without departing from the scope of the disclosure encompassed by the appended claims.

Some embodiments may provide one or more technical advantages that may transform the behavior or data. In some embodiments, technical advantages or functional improvements may include but are not limited to the improvement of making joint caching and forwarding decisions. Some embodiments provide a technical advantage or functional improvement in that a storage device in the network may make decisions based on packets passing through the storage device, and embodiments are adaptive, in that storage contents may automatically adapt to changes in content demand.

Embodiments provide technical advantages or functional improvements including optimality, e.g., attaining a cost reduction (but are not so limited) from the optimal cost reduction attained by existing approaches. Such embodiments herein significantly outperform existing approaches in both caching and forwarding methods in evaluations over a broad array of network topologies.

Further, embodiments provide technical advantages or functional improvements that include one or more of the following features: (1) jointly determining caching and forwarding decisions, rather than each separately, (2) having cost reduction, in contrast to existing approaches, (3) are both distributed and adaptive, and (4) operating using packet information passing through network nodes. According to some embodiments, these features may be implemented on networks including but not limited to content delivery networks, peer to peer networks, wireless edge networks, edge computing networks, cloud computing networks, information-centric networks, or any other networks known to one skilled in the art.

Yet further, embodiments provide technical advantages or functional improvements in that such embodiments can directly find application in a system where content is to be placed in a network with varying demand including but not limited to (i) Content delivery networks, (ii) Information centric networks, (iii) Peer-to-peer networks, and (iv) Cloud computing.

Some embodiments solve a technical problem, thereby providing a technical effect, by one or more of the following: by making joint caching and forwarding decisions; making decisions based on packets passing through the storage device; or automatically adapting to changes in content demand.

Embodiments solve a technical problem, thereby providing a technical effect, by including optimality, e.g., attaining a cost reduction (but is not so limited) from the optimal cost reduction attained by existing approaches. Such embodiments herein significantly outperform exiting approaches in both caching and forwarding methods in evaluations over a broad array of network topologies.

Further, embodiments solve a technical problem, thereby providing a technical effect, by including one or more of the following features: (1) jointly determining caching and forwarding decisions, rather than each separately, (2) having cost reduction, in contrast to existing approaches, (3) are both distributed and adaptive, and (4) operating using packet information passing through network nodes.

Yet further, embodiments solve a technical problem, thereby providing a technical effect, in that such embodiments can directly find application in a system where content is to be placed in a network with varying demand including but not limited to (i) Content delivery networks, (ii) Information centric networks, (iii) Peer-to-peer networks, and (iv) Cloud computing.

While example embodiments have been particularly shown and described, it will be understood by those skilled in the art that various changes in form and details may be made therein without departing from the scope of the embodiments encompassed by the appended claims.

REFERENCES

[1] A. Araldo, D. Rossi, and F. Martignon. Cost-aware caching: Caching more (costly items) for less (isps operational expenditures). *IEEE Transactions on Parallel and Distributed Systems,* 27(5):1316-1330, May 2016.

[2] Mikhail Badov, Anand Seetharam, Jim Kurose, Victor Firoiu, and Soumendra Nanda. Congestion-aware caching and search in information-centric networks. In *Proceedings of the 1st international conference on Information-centric networking,* pages 37-46. ACM, 2014.

[3] Dimitri P Bertsekas. *Nonlinear programming.* Athena scientific Belmont, 1999.

[4] Dimitri Bertsekas and Robert Gallager. *Data Networks (2Nd Ed.).* Prentice-Hall, Inc., Upper Saddle River, N.J., USA, 1992.

[5] Giovanna Carofiglio, Massimo Gallo, Luca Muscariello, and Diego Perino. Modeling data transfer in content-centric networking. In *Proceedings of the 23rd International Teletraffic Congress,* ITC'11, pages 111-118. International Teletraffic Congress, 2011.

[6] G. Carofiglio, M. Gallo, L. Muscariello, M. Papalini, and Sen Wang. Optimal multipath congestion control and request forwarding in information-centric networks. In *Network Protocols (ICNP),* 2013 21st IEEE International Conference on, pages 1-10, October 2013.

[7] G. Carofiglio, L. Mekinda, and L. Muscariello. Focal: Forwarding and caching with latency awareness in information-centric networking. In 2015 *IEEE Globecom Workshops (GC Wkshps),* pages 1-7, December 2015.

[8] G. Carofiglio, L. Mekinda, and L. Muscariello. Lac: Introducing latency-aware caching in information-centric networks. In 2015 *IEEE 40th Conference on Local Computer Networks (LCN),* pages 422-425, October 2015.

[9] Wei Koong Chai, Diliang He, Ioannis Psaras, and George Pavlou. Cache ?less for more? in information-centric networks. In *International Conference on Research in Networking,* pages 27-40. Springer, 2012.

[10] M. Dehghan, L. Massoulie, D. Towsley, D. Menasche, and Y. C. Tay. A utility optimization approach to network cache design. In *IEEE INFOCOM 2016—The 35th Annual IEEE International Conference on Computer Communications,* pages 1-9, April 2016.

[11] A. Detti, C. Pisa, and N. Blefari Melazzi. Modeling multipath forwarding strategies in information centric networks. In 2015 *IEEE Conference on Computer Communications Workshops,* pages 324-329, April 2015.

[12] R. G. Gallager. A minimum delay routing method using distributed computation. *Communications, IEEE Transactions on,* 25(1):73-85, January 1977.

[13] Stratis Ioannidis and Edmund Yeh. Adaptive caching networks with optimality guarantees. In *Proceedings of the 2016 ACM SIGMETRICS International Conference on Measurement and Modeling of Computer Science,* pages 113-124. ACM, 2016.

[14] Van Jacobson, Diana K. Smetters, James D. Thornton, Michael F. Plass, Nicholas H. Briggs, and Rebecca L. Braynard. Networking named content. In *Proceedings of CoNEXT '09,* pages 1-12, New York, N.Y., USA, 2009. ACM.

[15] Frank P Kelly. *Reversibility and stochastic networks.* Cambridge University Press, 2011.

[16] Milad Mandian, Somaya Arianfar, Jim Gibson, and Dave Oran. Mircc: Multipath-aware icn rate-based congestion control. In *Proceedings of the 3rd ACM Conference on Information-Centric Networking,* ACM-ICN '16, pages 1-10, New York, N.Y., USA, 2016. ACM.

[17] Z. Ming, M. Xu, and D. Wang. Age-based cooperative caching in information-centric networking. In 2014 *23rd International Conference on Computer Communication and Networks,* pages 1-8, August 2014.

[18] D. Nguyen, K. Sugiyama, and A. Tagami. Congestion price for cache management in information-centric networking. In 2015 *IEEE Conference on Computer Communications Workshops,* pages 287-292, April 2015.

[19] D. Posch, B. Rainer, and H. Hellwagner. Saf: Stochastic adaptive forwarding in named data networking. *IEEE/ACM Transactions on Networking,* 25(2):1089-1102, April 2017.

[20] Karthikeyan Shanmugam, Negin Golrezaei, Alexandros G Dimakis, Andreas F Molisch, and Giuseppe Caire. Femtocaching: Wireless content delivery through distributed caching helpers. *IEEE Transactions on Information Theory,* 59(12):8402-8413, 2013.

[21] Yannis Thomas, George Xylomenos, Christos Tsilopoulos, and George C. Polyzos. Object-oriented packet caching for icn. In *Proceedings of the 2Nd ACM Conference on Information-Centric Networking,* ACM-ICN '15, pages 89-98, New York, N.Y., USA, 2015. ACM.

[22] Yufang Xi and E. M. Yeh. Node-based optimal power control, routing, and congestion control in wireless networks. *Information Theory, IEEE Transactions on,* 54(9): 4081-4106, September 2008.

[23] Edmund Yeh, Tracey Ho, Ying Cui, Michael Burd, Ran Liu, and Derek Leong. Vip: A framework for joint dynamic forwarding and caching in named data networks. In *Proceedings of the 1st ACM Conference on Information-Centric Networking,* ACM-ICN '14, pages 117-126, New York, N.Y., USA, 2014. ACM.

[24] Cheng Yi, Alexander Afanasyev, Lan Wang, Beichuan Zhang, and Lixia Zhang. Adaptive forwarding in named data networking. *SIGCOMM Comput. Commun. Rev.,* 42(3):62-67, June 2012.

What is claimed is:

1. A content delivery network, comprising:
nodes communicatively coupled to neighboring nodes via respective links, each node configured to cache a unit of content and send a content request to an upstream neighboring node to request the unit of content if not cached,
a given node among the nodes configured to calculate (i) marginal cost of caching the unit of content, and (ii) marginal cost of forwarding the content request to at least one neighboring node, the marginal cost of the forwarding the content request and the marginal cost of the caching the unit of content both being dependent on both link congestion between the given node and the at least one neighboring node and link congestion on links of an upstream path of nodes toward and including a source node, the source node guaranteed to have the unit of content available, each node along the upstream path being configured to perform a respective calculation of the cost and to report same to its downstream neighboring node making the content request, the given node configured to direct content of the unit of content for delivery to a destination node.

2. The content delivery network of claim 1, further comprising using the marginal cost of the forwarding of the content request to update variables of the caching and the forwarding by solving a linear program with a gradient, each iteration of the linear program resulting in an integer value.

3. The content delivery network of claim 1, wherein the unit of content comprises data units or chunks thereof of equal size.

4. The content delivery network of claim 1, wherein the total arrival rate of requests at the given node for the unit of content includes content requests from outside of the network and content requests from within the network.

5. The content delivery network of claim 1, further comprising calculating cache scores from a product of a total arrival rate of requests at the given node for the unit of content and corresponding marginal costs of forwarding the requests; and
further comprising determining whether to cache a unit of content at the given node based on its corresponding cache score.

6. The content delivery network of claim 5, wherein determining whether to cache the unit of content is performed based upon a ranking of highest values of the cache scores associated with respective units of content.

7. The content delivery network of claim 5, wherein a rate of arrival of requests for the unit of content changes over time, and wherein each node adapts to the changes by (i) making a decision to cache the unit of content based upon the cache scores, and (ii) making a decision to forward the requests for the unit of content based upon the marginal forwarding cost.

8. A computer-implemented method for delivering content in a network, the computer-implemented method comprising:
by each node, communicatively coupled to neighboring nodes via respective links in the network, caching a unit of content and sending a content request to an upstream neighboring node to request the unit of content if not cached,
by a given node among the nodes, calculating (i) marginal cost of caching the unit of content, and (ii) marginal cost of forwarding the content request to at least one neighboring node, the marginal cost of the forwarding the content request and the marginal cost of the caching the unit of content both being dependent on both link congestion between the given node and the at least one neighboring node and link congestion on links of an upstream path of nodes toward and including a source node, the source node guaranteed to have the unit of content available, each node along the upstream path performing a respective calculation of the cost and reporting same to its downstream neighboring node making the content request, the given node directing content of the unit of content for delivery to a destination node.

9. The method of claim 8, further comprising using the marginal cost of the forwarding of the content request to update variables of the caching and the forwarding by solving a linear program with a gradient, each iteration of the linear program resulting in an integer value.

10. The method of claim 8, wherein the unit of content comprises data units or chunks thereof of equal size.

11. The method of claim 8, wherein the total arrival rate of requests at the given node for the unit of content includes content requests from outside of the network and content requests from within the network.

12. The method of claim 8, further comprising calculating cache scores from a product of a total arrival rate of requests at the given node for the unit of content and corresponding marginal costs of forwarding the requests; and
further comprising determining whether to cache a unit of content at the given node based on its corresponding cache score.

13. The method of claim 12, wherein determining whether to cache the unit of content is performed based upon a ranking of highest values of the cache scores associated with respective units of content.

14. The method of claim 12, wherein a rate of arrival of requests for the unit of content changes over time, and wherein each node adapts to the changes by (i) making a decision to cache the unit of content based upon the cache scores, and (ii) making a decision to forward the requests for the unit of content based upon the marginal forwarding cost.

15. A network node communicatively coupled to neighboring nodes via respective links, the network node configured to cache a unit of content and send a content request to an upstream neighboring node to request the unit of content if not cached at the network node, the network node comprising:
a network interface; and
a processor configured to calculate (i) marginal cost of caching the unit of content, and (ii) marginal cost of forwarding the content request to at least one neighboring node, the marginal cost of the forwarding the content request and the marginal cost of the caching the unit of content both being dependent on both link congestion between the network node and the at least one neighboring node and link congestion on links of an upstream path of nodes toward and including a source node, the source node guaranteed to have the unit of content available, each node along the upstream path being configured to perform a respective calculation of the cost and to report same to its downstream neighboring node making the content request, the processor configured to direct content of the unit of content for delivery to a destination node via the network interface.

16. The network node of claim 15, wherein the processor is further configured to use the marginal cost of the forwarding of the content request to update variables of the caching and the forwarding by solving a linear program with a gradient, each iteration of the linear program resulting in an integer value.

17. The network node of claim 15, wherein the unit of content comprises data units or chunks thereof of equal size.

18. The network node of claim 15, wherein the total arrival rate of requests at the network node for the unit of content includes content requests from outside of the network and content requests from within the network.

19. The network node of claim 15, wherein the processor is further configured to calculate cache scores from a product of a total arrival rate of requests at the network node for the unit of content and corresponding marginal costs of forwarding the requests;

and wherein the processor is further configured to determine whether to cache a unit of content at the network node based on its corresponding cache score.

20. The network node of claim 19, wherein the processor, in determining whether to cache the unit of content, is further configured to perform a ranking of highest values of the cache scores associated with respective units of content and cache the unit of content based on the ranking.

21. The network node of claim 19, wherein a rate of arrival of requests for the unit of content changes over time, and wherein the processor adapts the network node to the changes by (i) making a decision to cache the unit of content based upon the cache scores, and (ii) making a decision to forward the requests for the unit of content based upon the marginal forwarding cost.

22. A computer program product including a non-transitory computer-readable medium having processor-executable instructions stored thereon, the instructions, when loaded and executed by a processor, cause a node in a network, the node communicatively coupled to neighboring nodes in the network via respective links, to:

cache a unit of content and send a content request to an upstream neighboring node to request the unit of content if not cached; and calculate (i) marginal cost of caching the unit of content, and (ii) marginal cost of forwarding the content request to at least one neighboring node, the marginal cost of forwarding the content request and the marginal cost of caching the unit of content both being dependent on both link congestion between the given node and the at least one neighboring node and link congestion on links of an upstream path of nodes toward and including a source node, the source node guaranteed to have the unit of content available, each node along the upstream path performing a respective calculation of the cost and reporting same to its downstream neighboring node making the content request, the given node directing content of the unit of content for delivery to a destination node.

* * * * *